Figure 10:
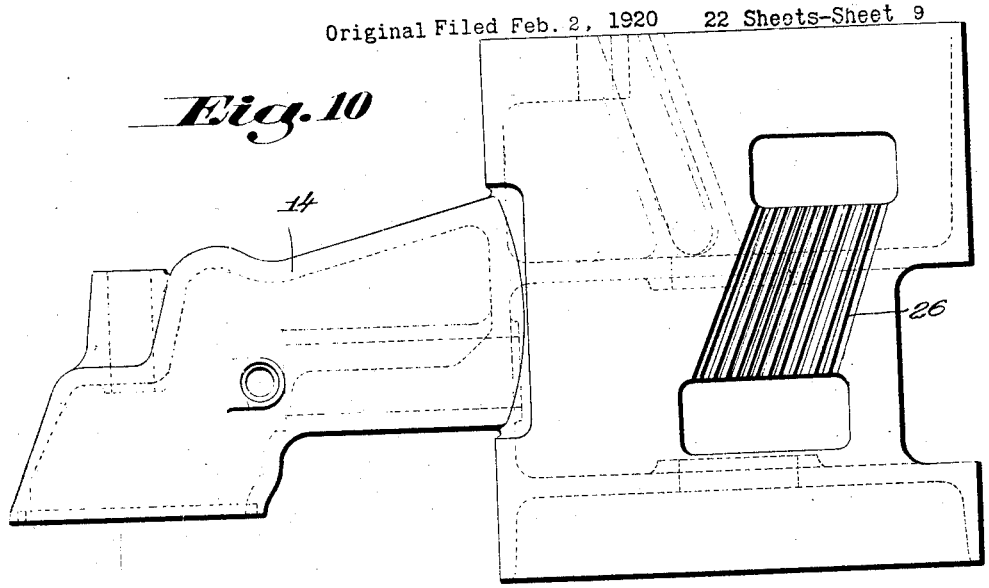

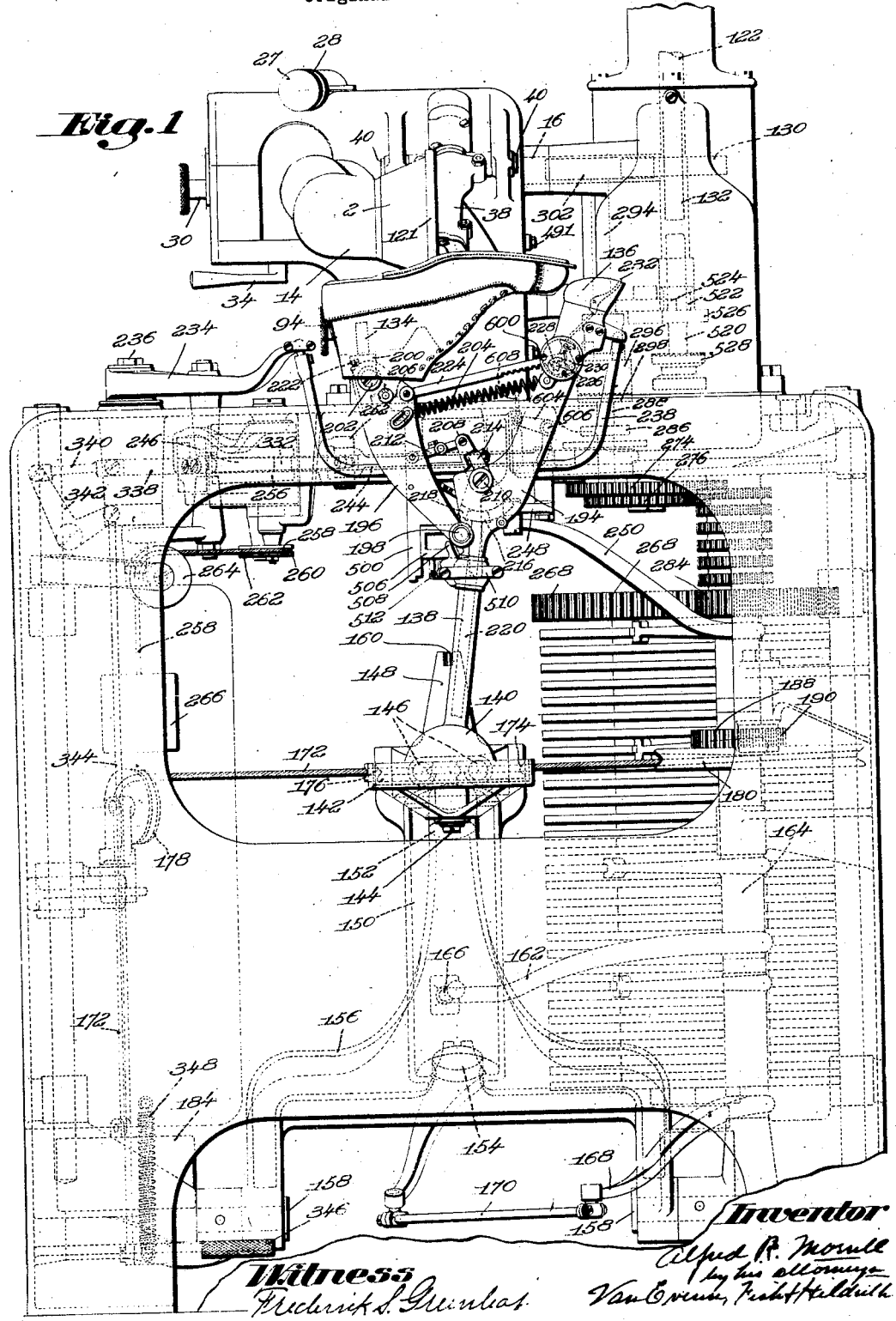

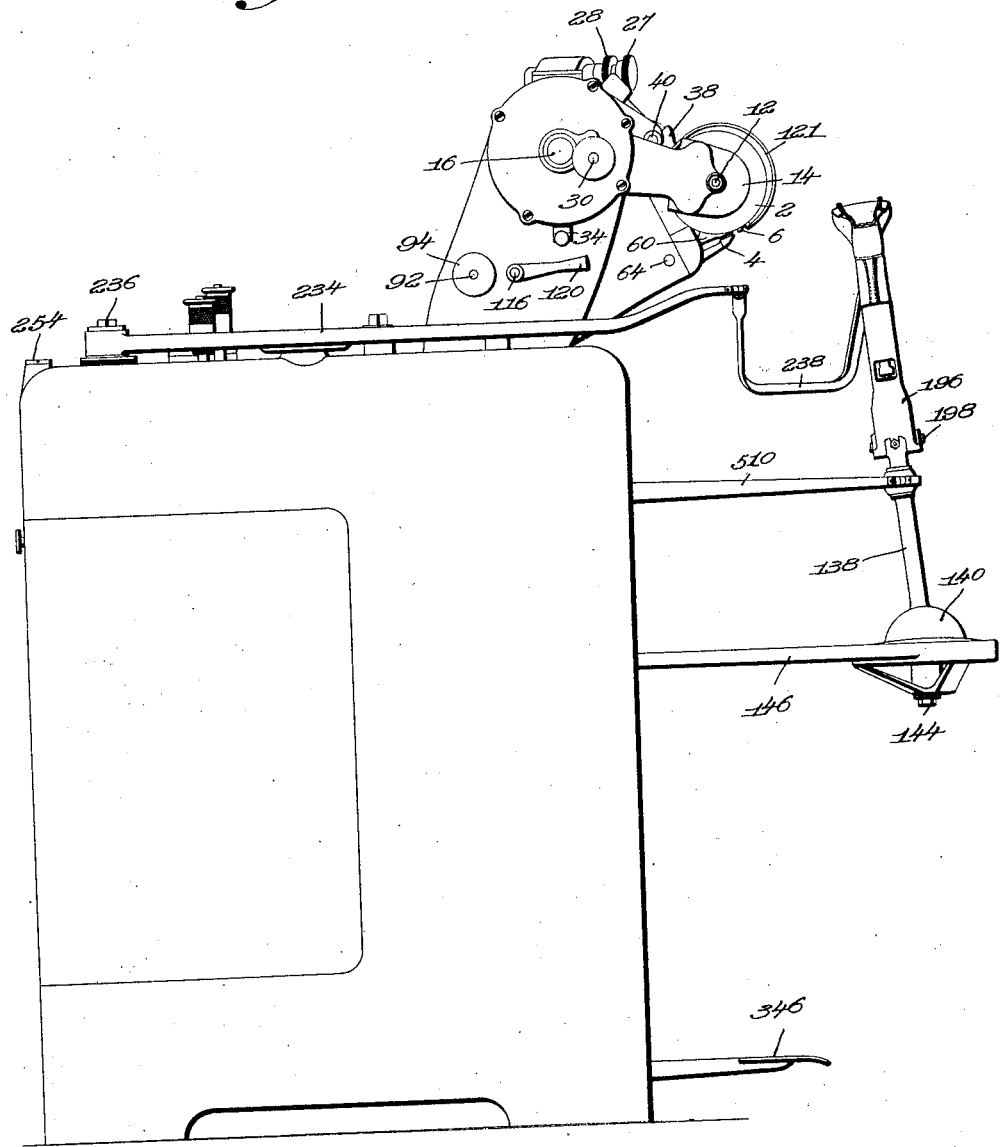

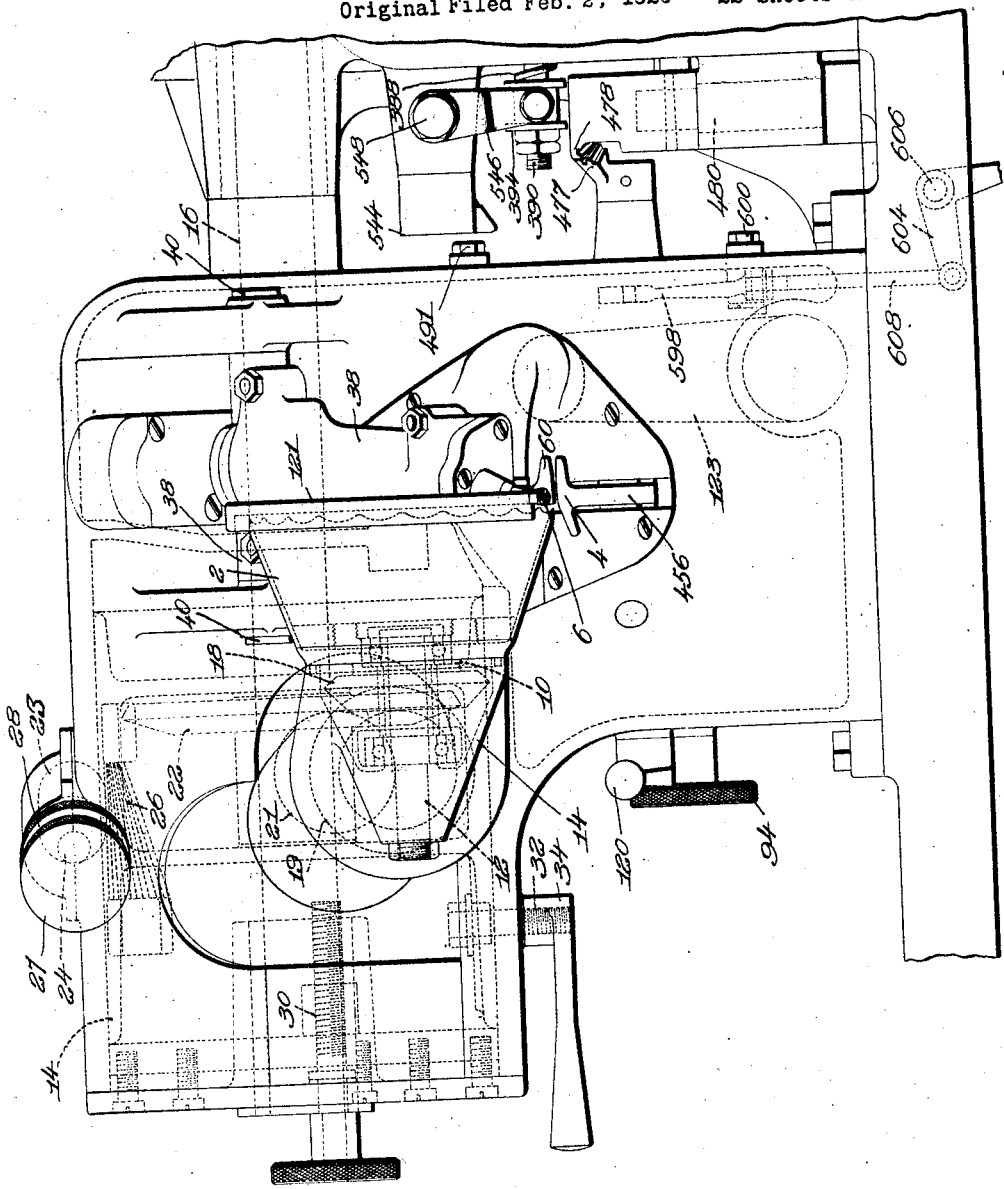

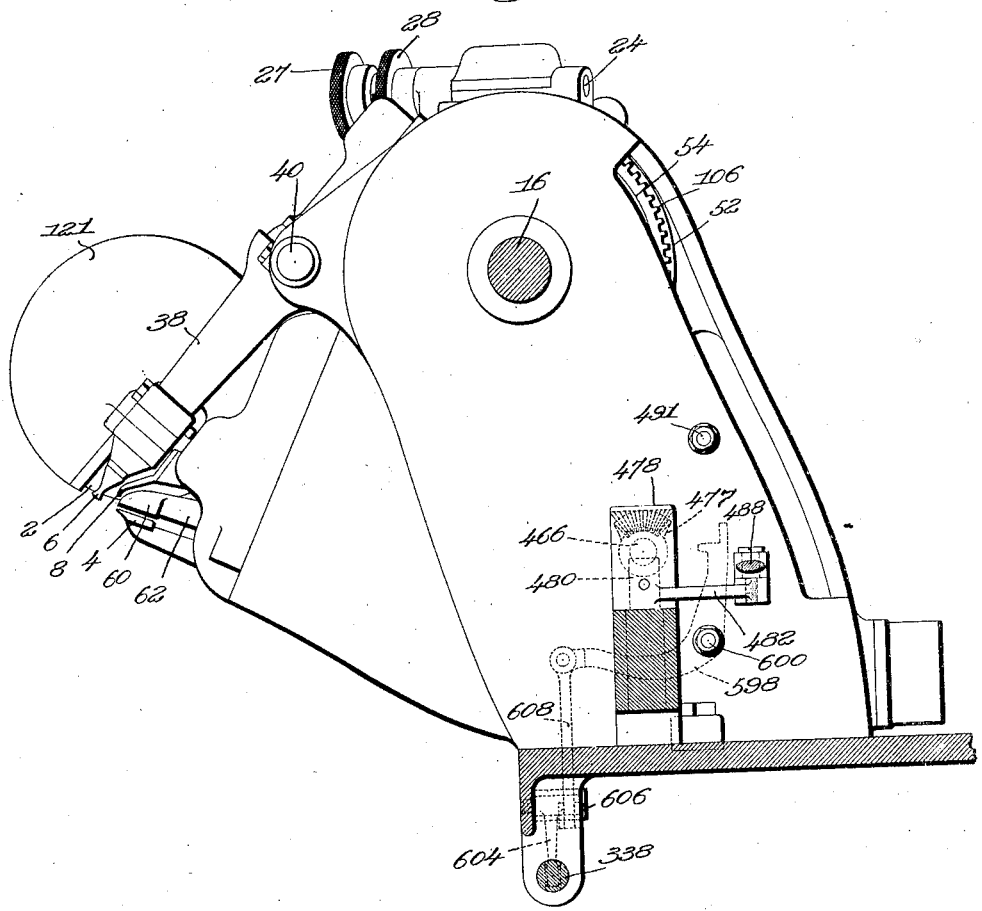

Oct. 30, 1928.
A. R. MORRILL
1,689,594
SHOE MACHINE
Original Filed Feb. 2, 1920   22 Sheets-Sheet 5
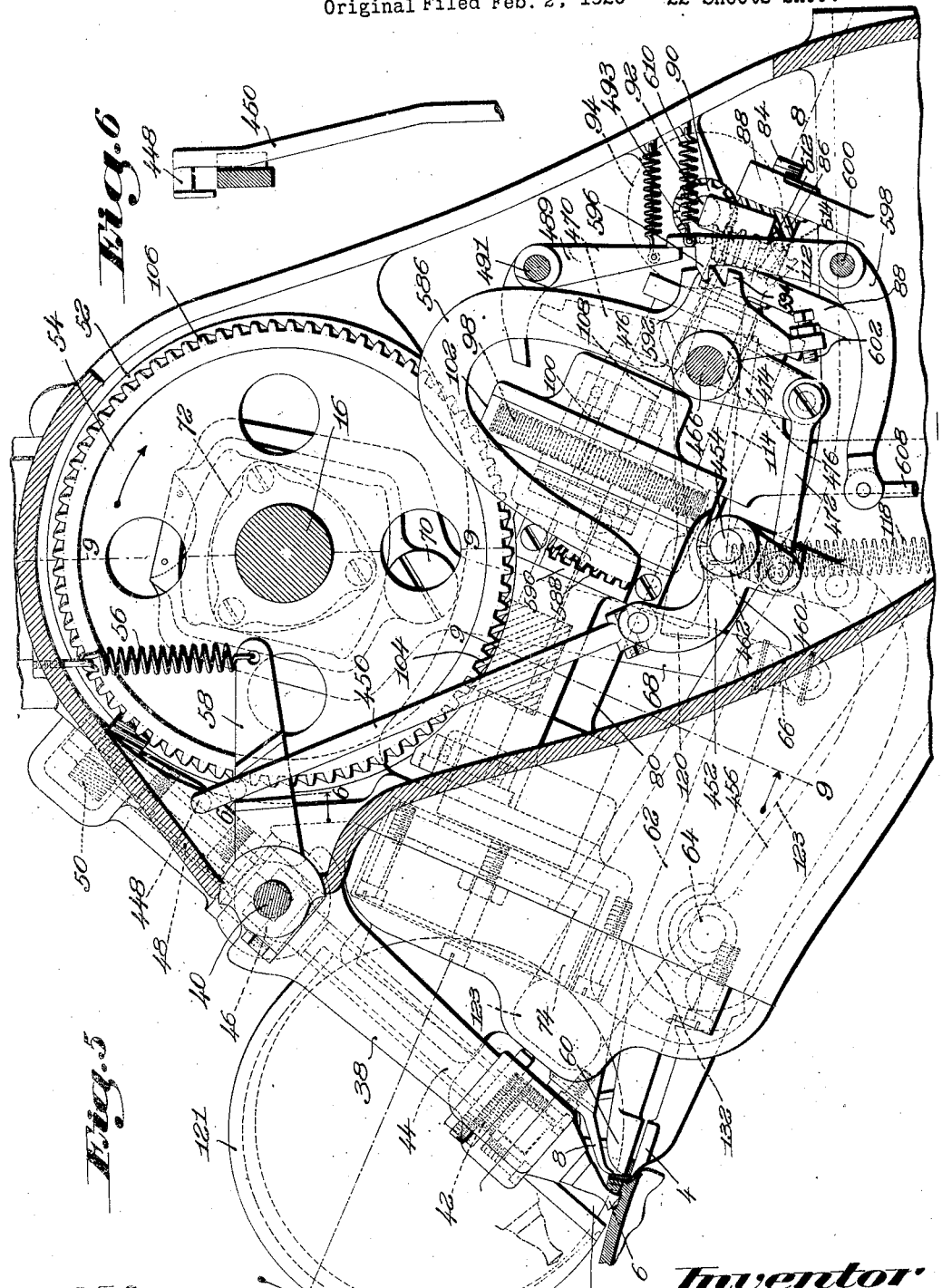

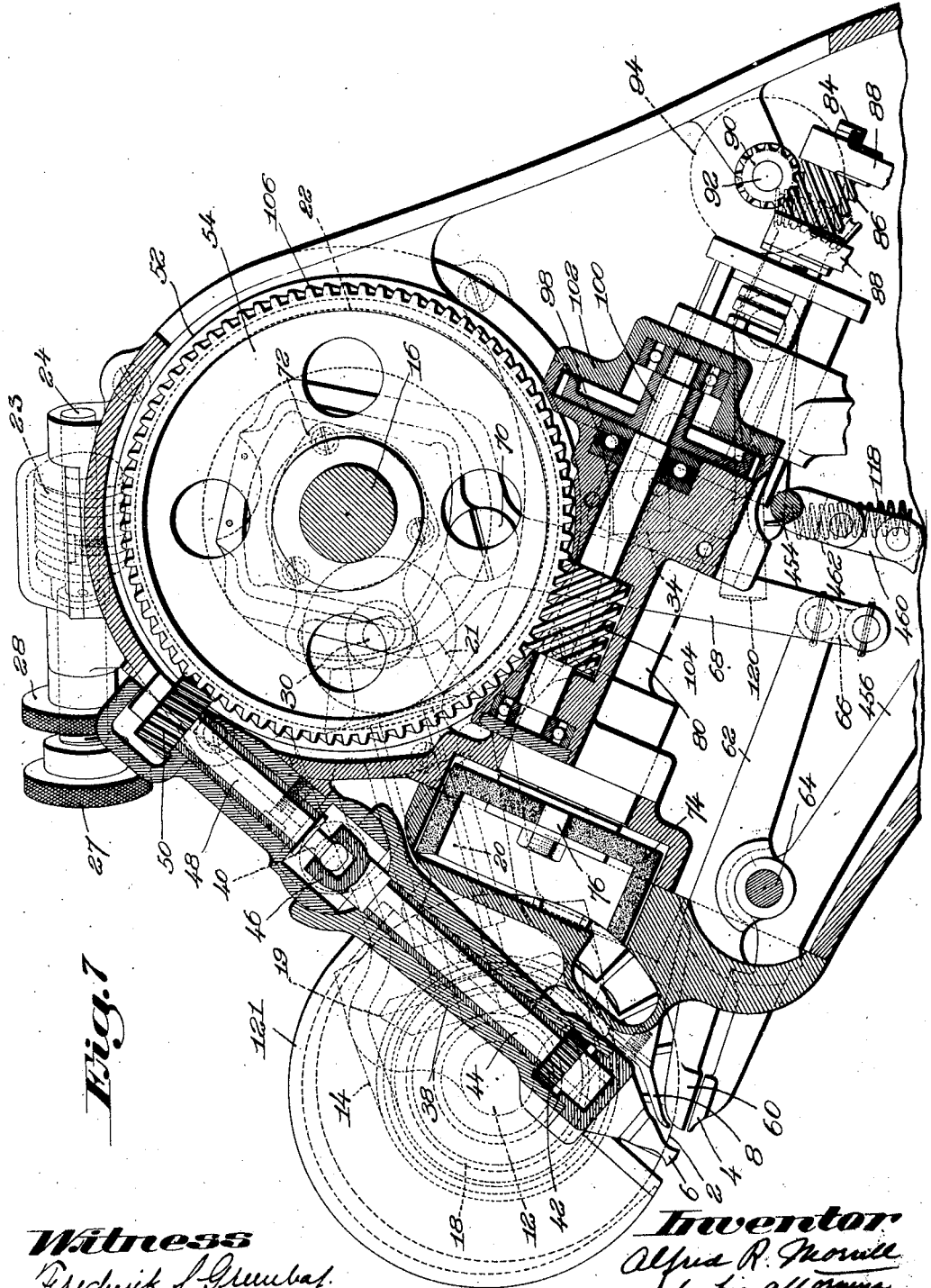

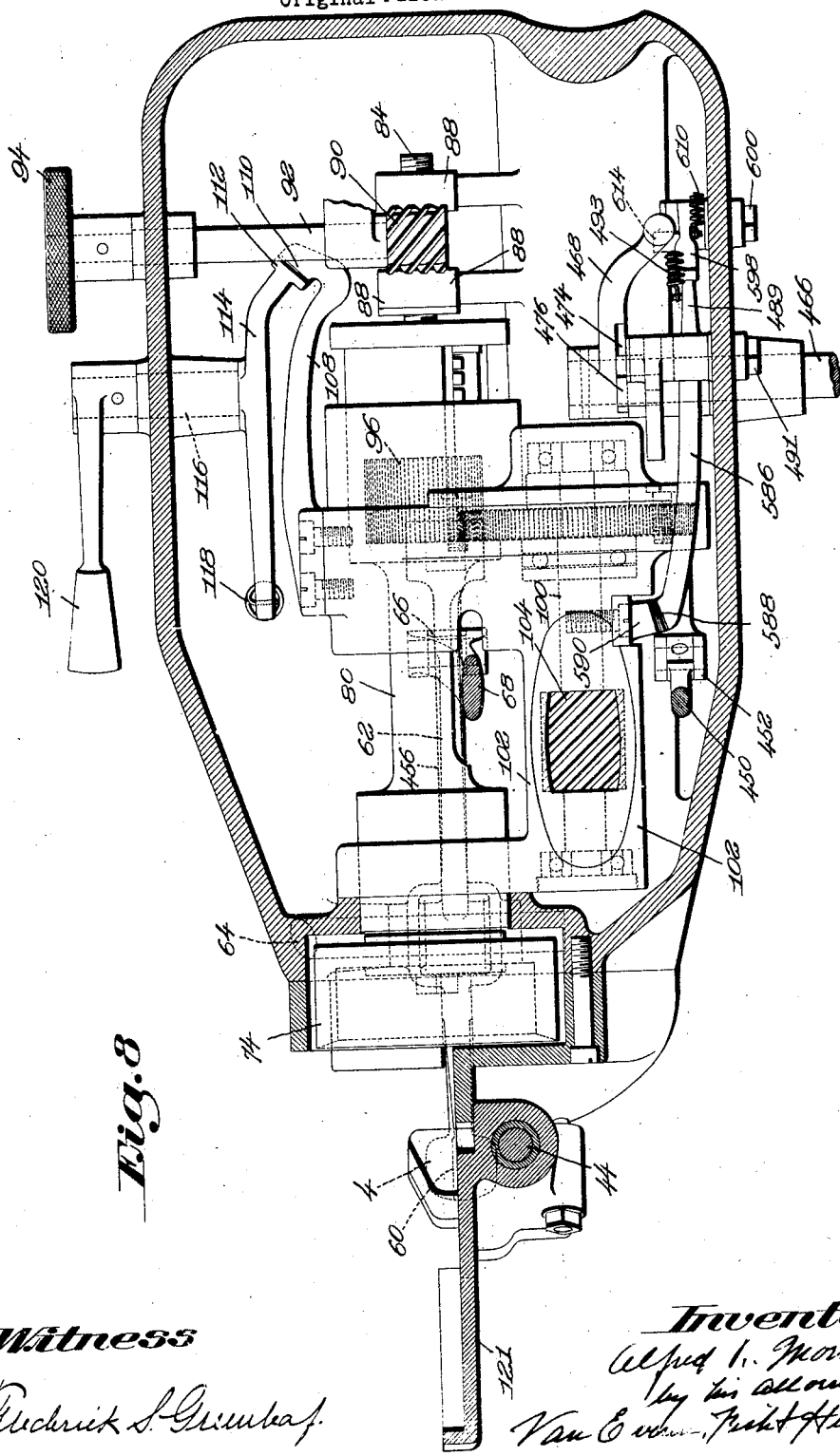

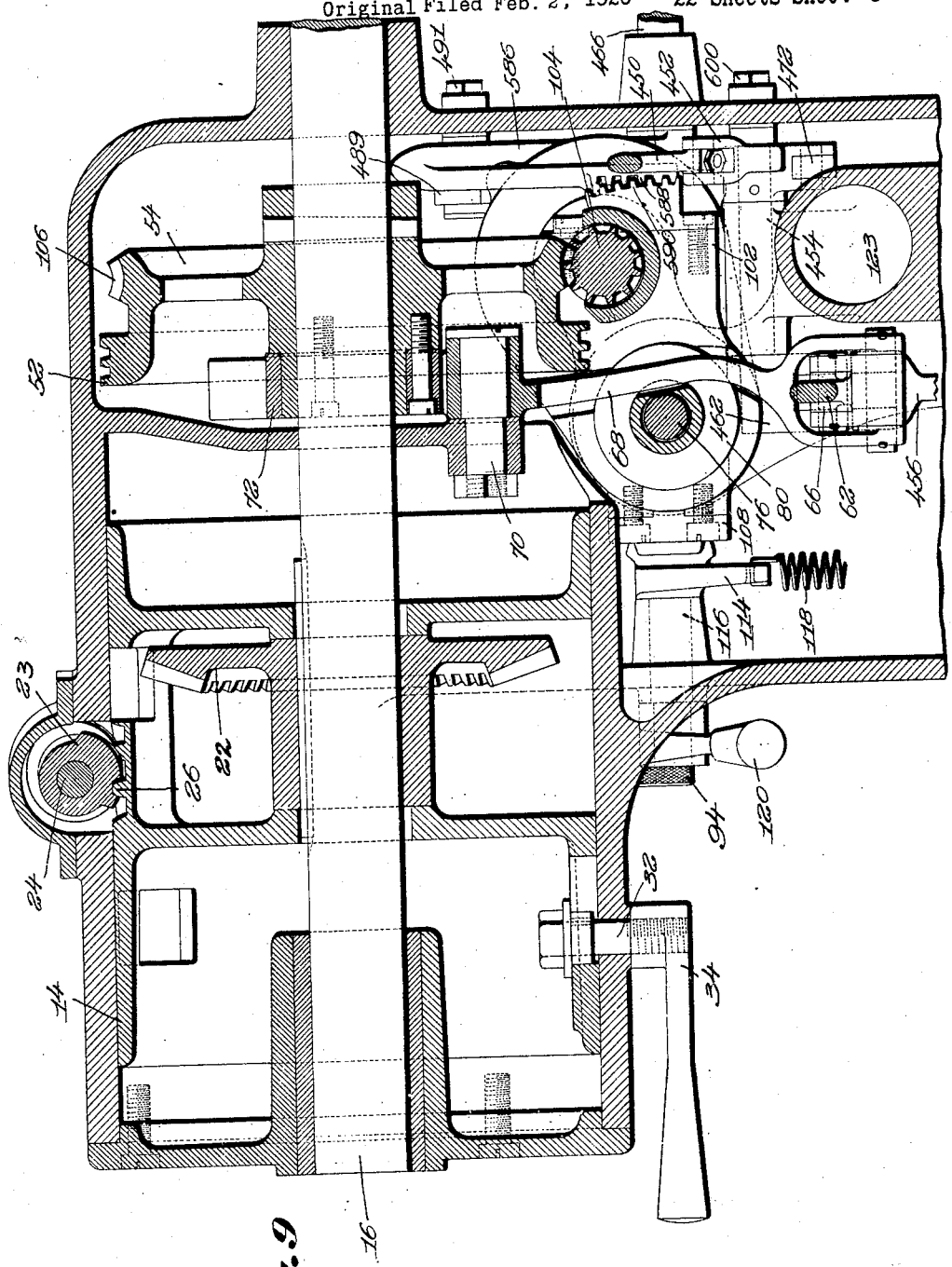

Oct. 30, 1928.

A. R. MORRILL 1,689,594

SHOE MACHINE

Original Filed Feb. 2, 1920  22 Sheets-Sheet 9

Oct. 30, 1928.
A. R. MORRILL
SHOE MACHINE
Original Filed Feb. 2, 1920   22 Sheets-Sheet 10
1,689,594
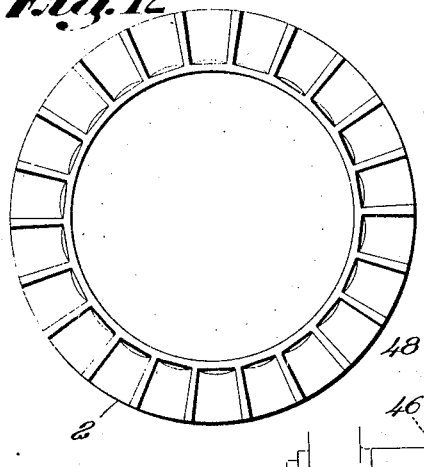
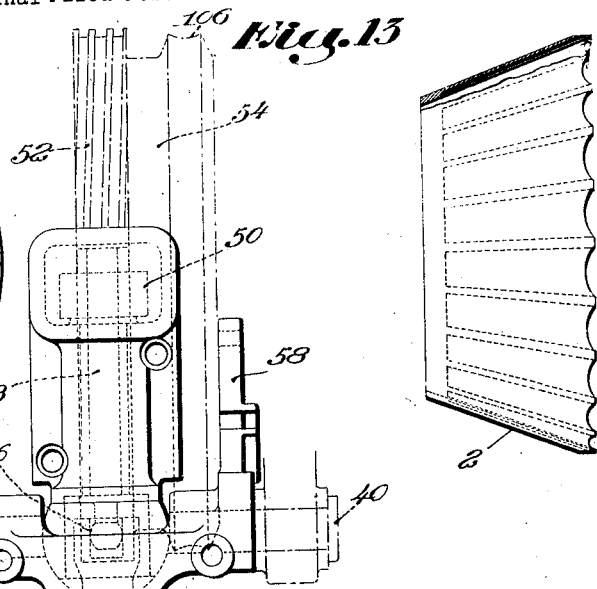
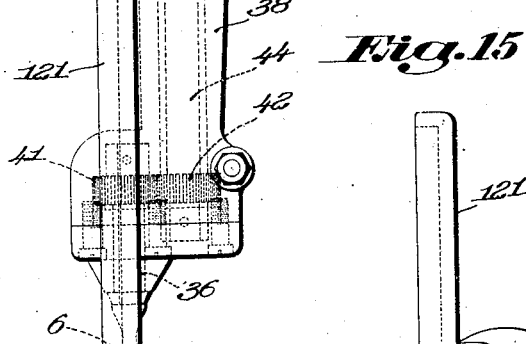
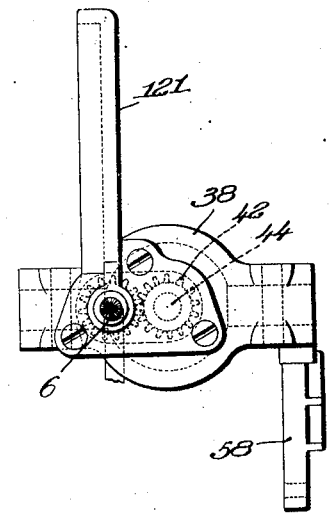
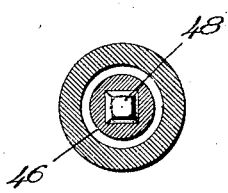

Oct. 30, 1928.  
A. R. MORRILL  
SHOE MACHINE  
Original Filed Feb. 2, 1920    22 Sheets-Sheet 11
1,689,594
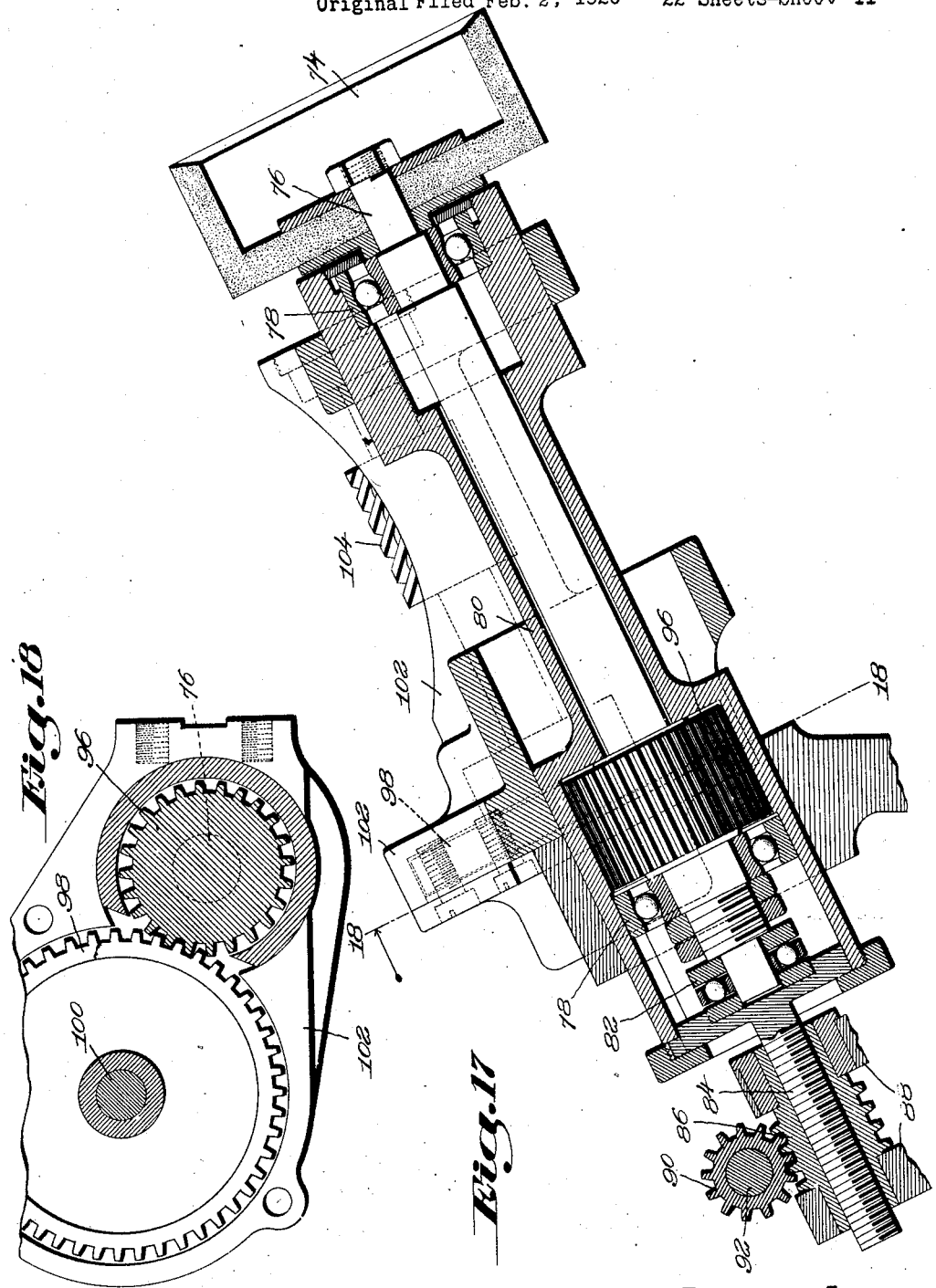

Oct. 30, 1928.
A. R. MORRILL
1,689,594
SHOE MACHINE
Original Filed Feb. 2, 1920    22 Sheets-Sheet 12
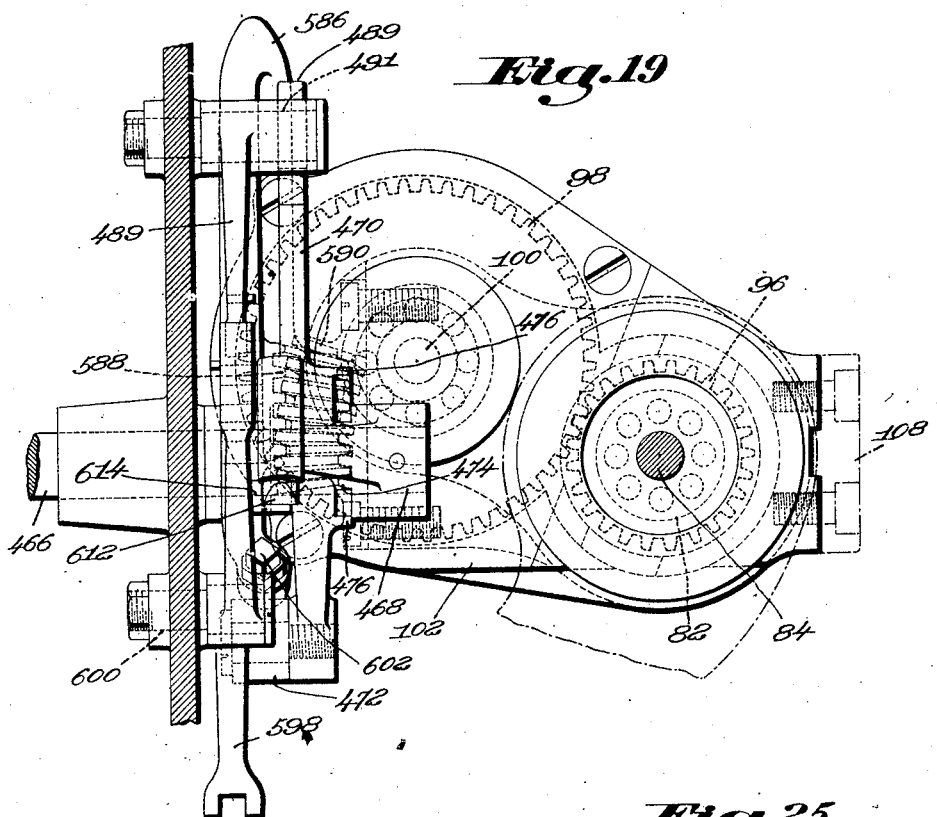
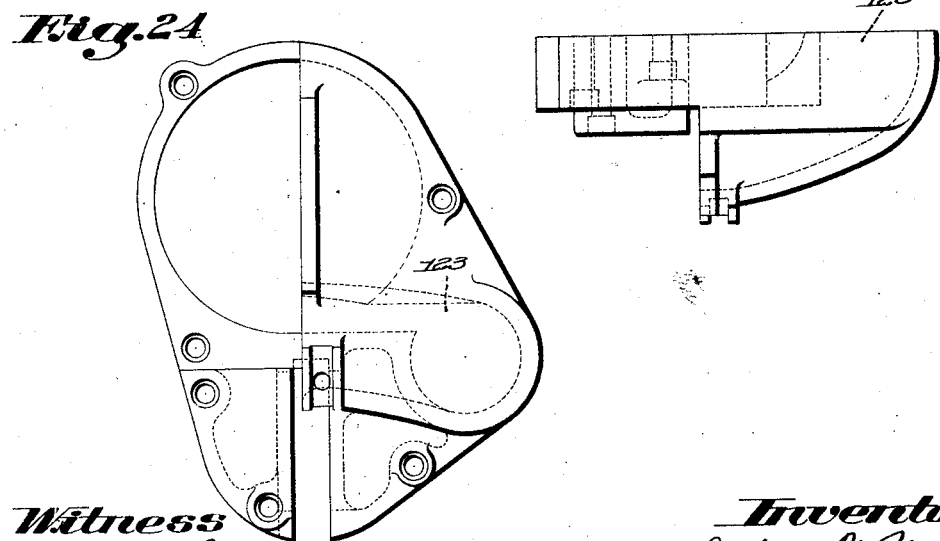
Witness
Frederick S. Greenleaf.
Inventor
Alfred R. Morrill
by his attorneys
Van Everen Fish & Hildreth Oct. 30, 1928.
A. R. MORRILL
1,689,594
SHOE MACHINE
Original Filed Feb. 2, 1920   22 Sheets-Sheet 13
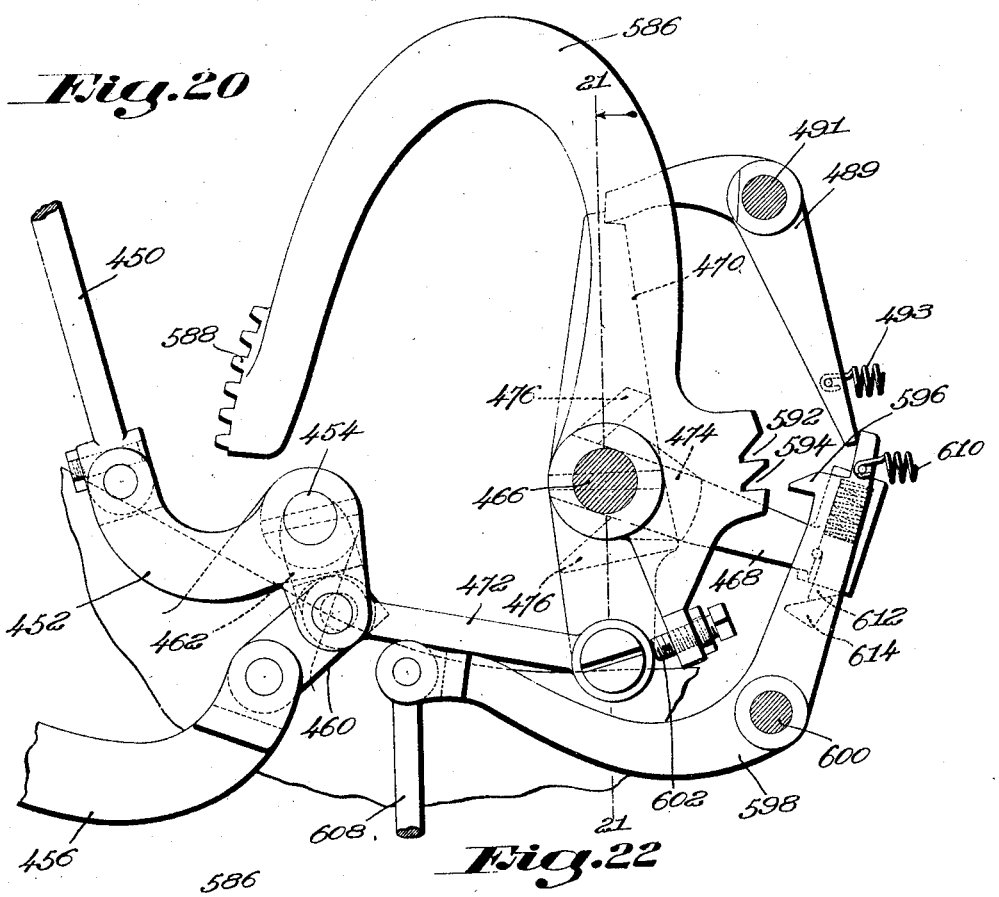
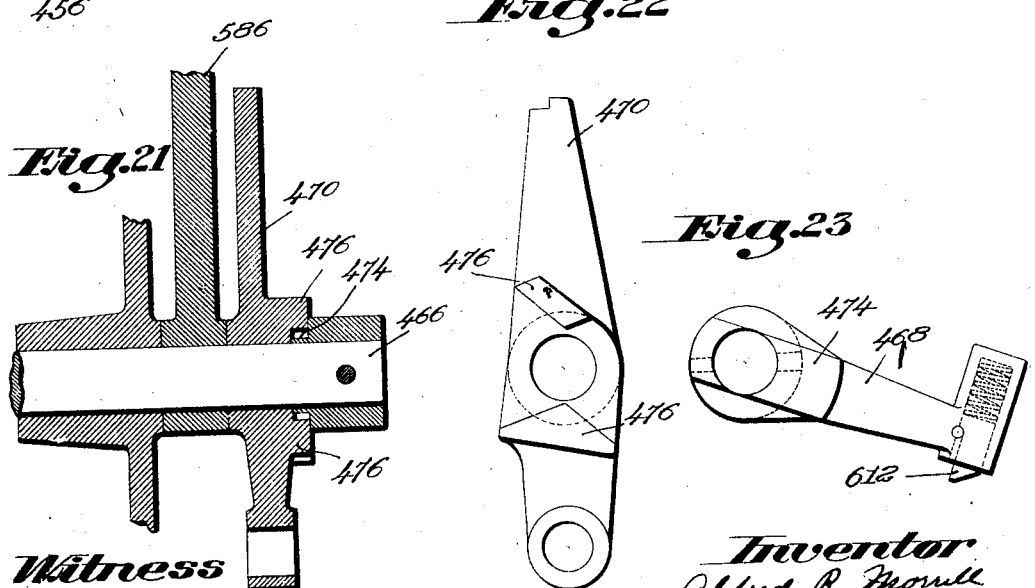

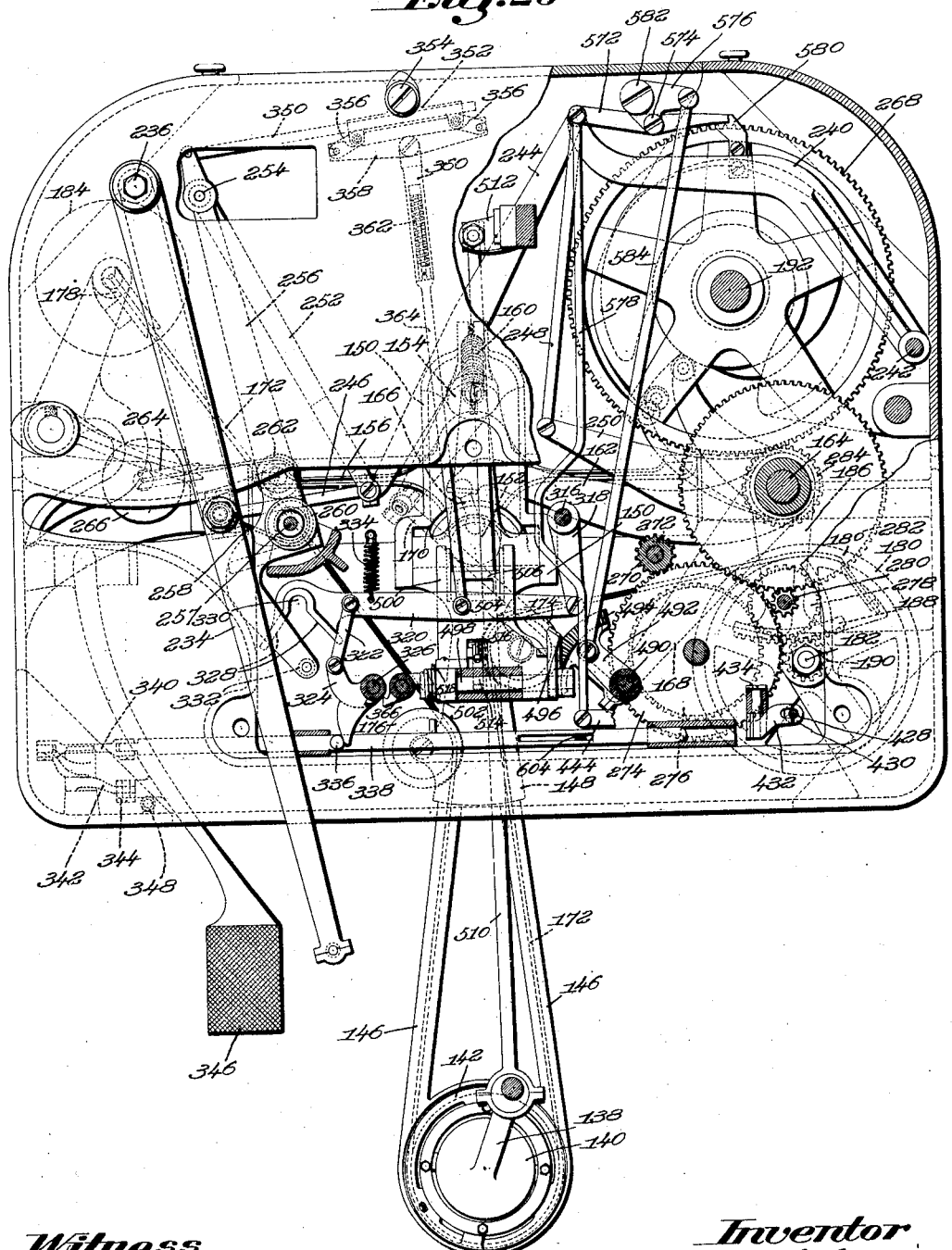

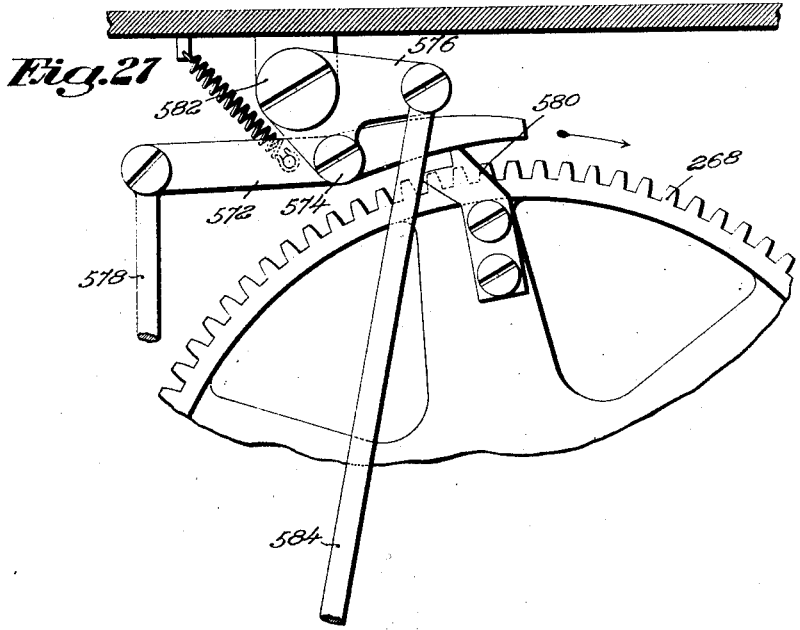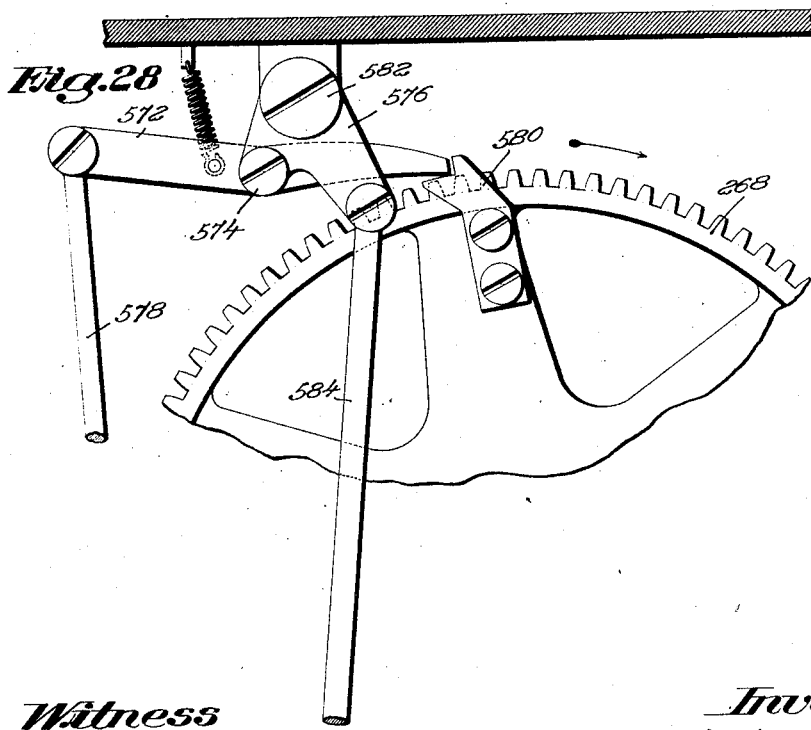

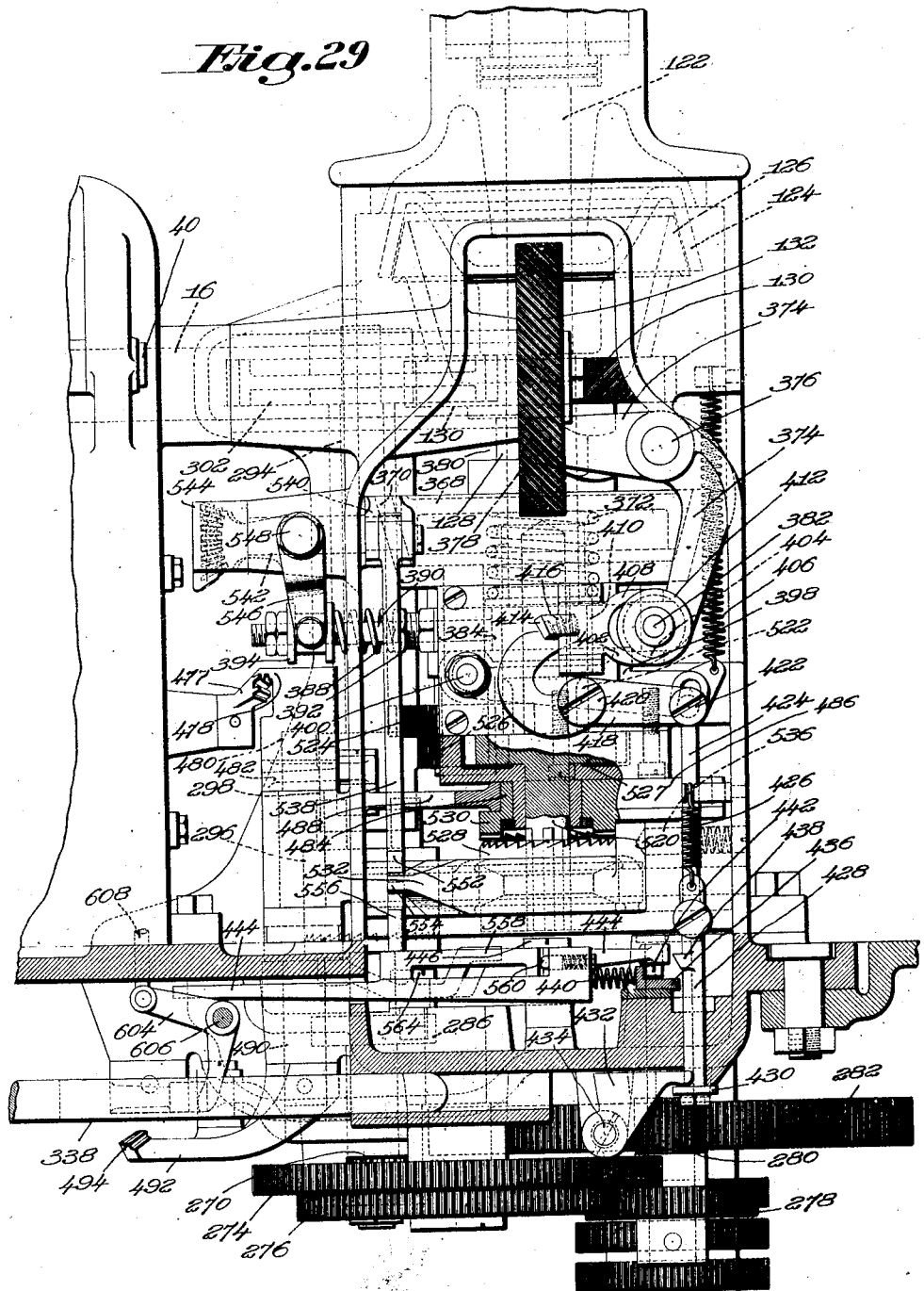

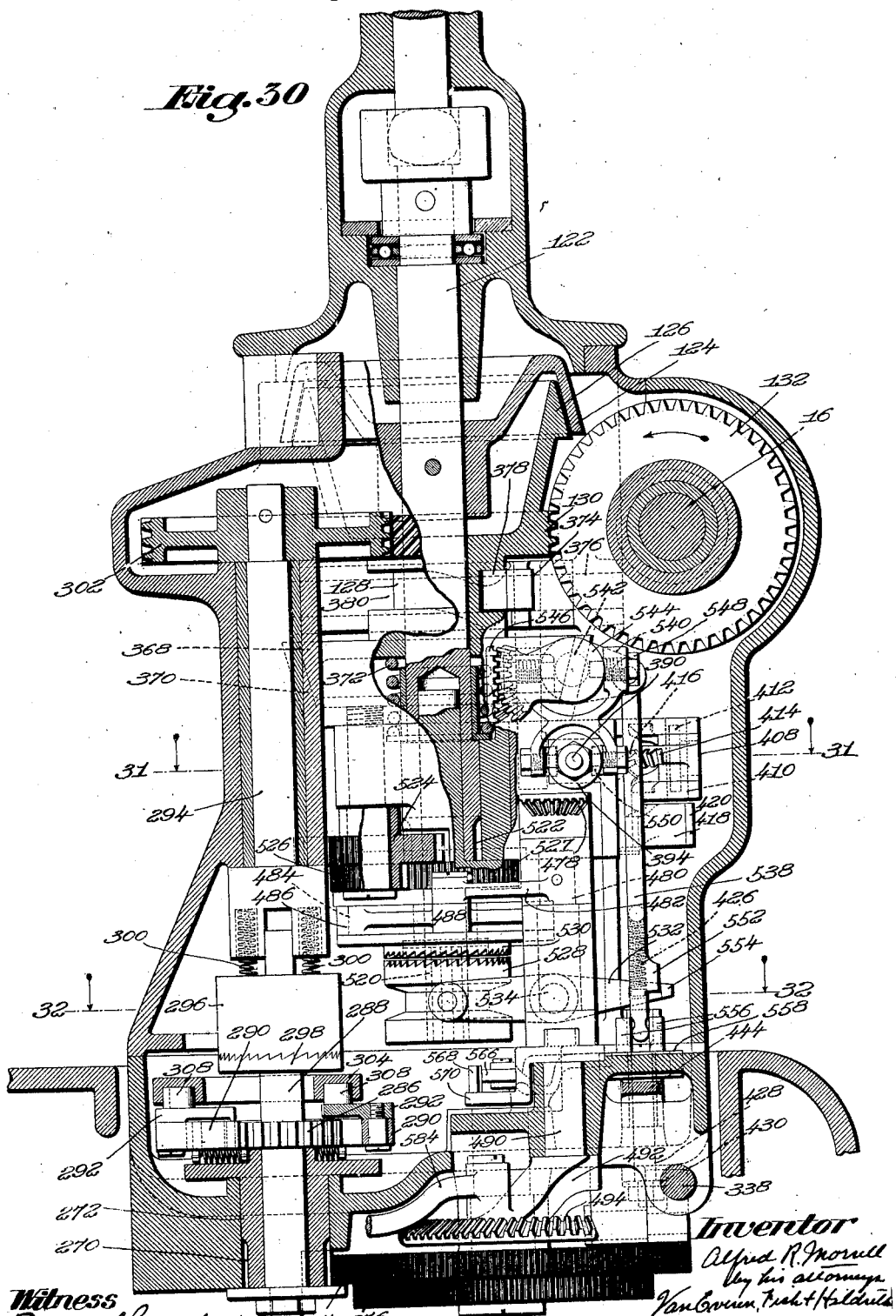

Oct. 30, 1928.　　　　　　　　　　　　　　　　　　1,689,594
A. R. MORRILL
SHOE MACHINE
Original Filed Feb. 2, 1920　　22 Sheets-Sheet 18

Witness
Frederick S. Greenleaf

Inventor
Alfred R. Morrill
by his attorneys
Van Evera, Fish & Hildreth

Oct. 30, 1928.
A. R. MORRILL
1,689,594
SHOE MACHINE
Original Filed Feb. 2, 1920    22 Sheets-Sheet 19
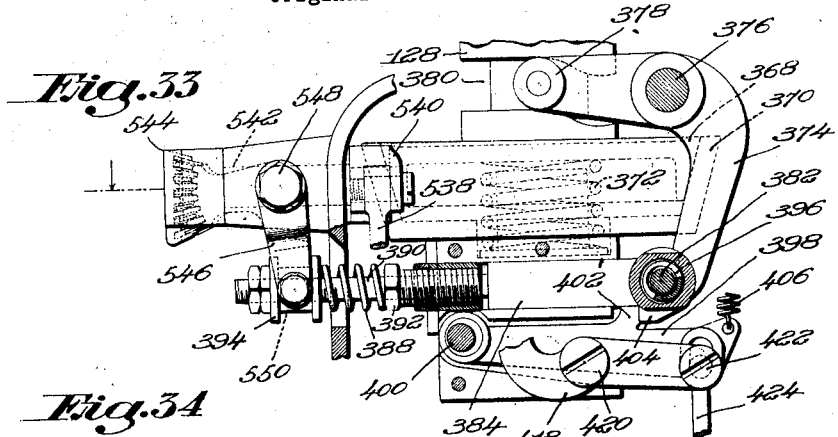
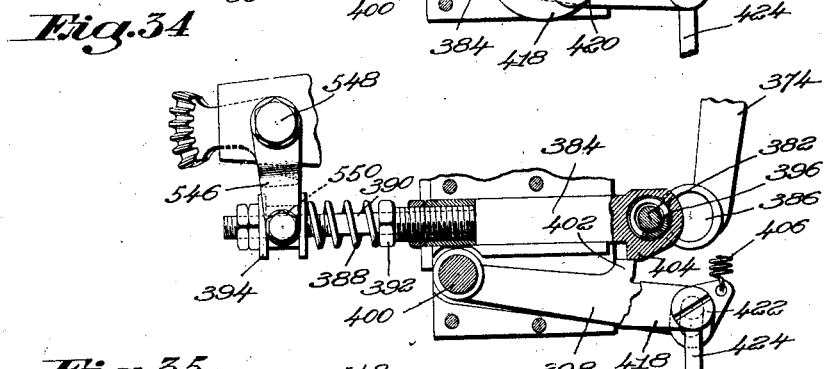
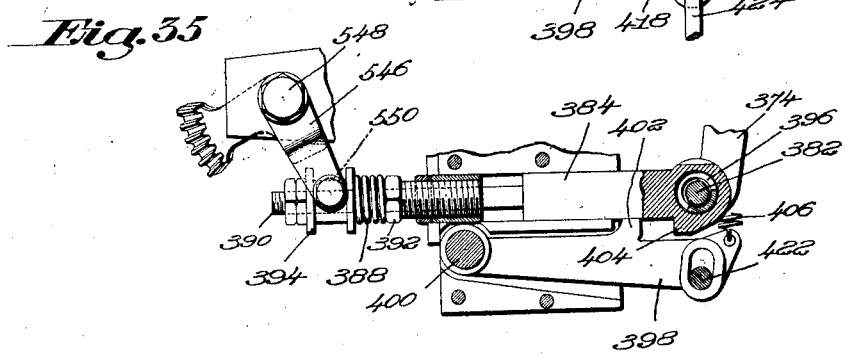
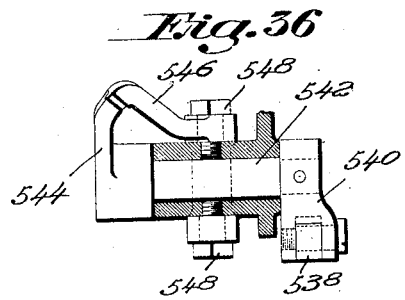

Oct. 30, 1928.  1,689,594
A. R. MORRILL
SHOE MACHINE
Original Filed Feb. 2, 1920   22 Sheets-Sheet 20
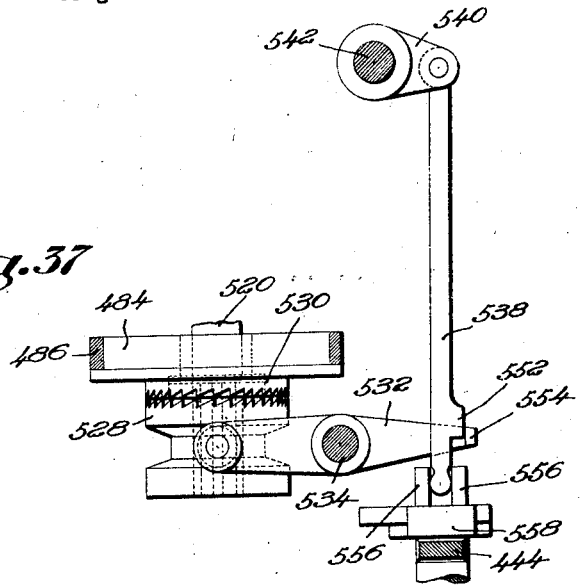
Fig.37
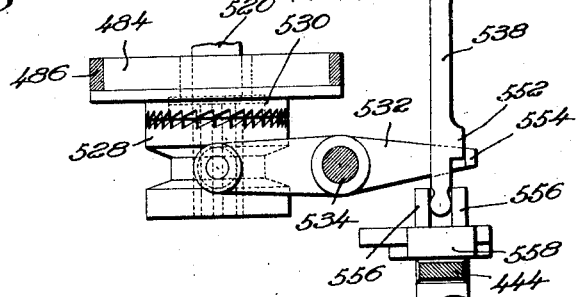
Fig.38
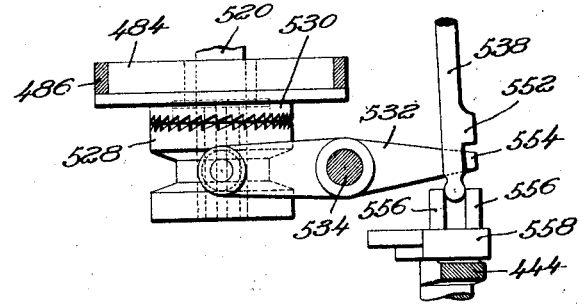
Fig.39
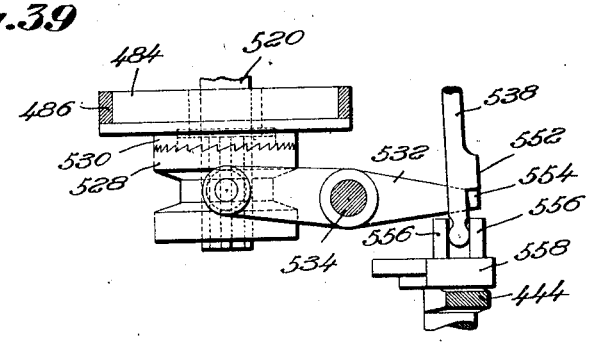

Oct. 30, 1928.

A. R. MORRILL 1,689,594

SHOE MACHINE

Original Filed Feb. 2, 1920  22 Sheets-Sheet 21

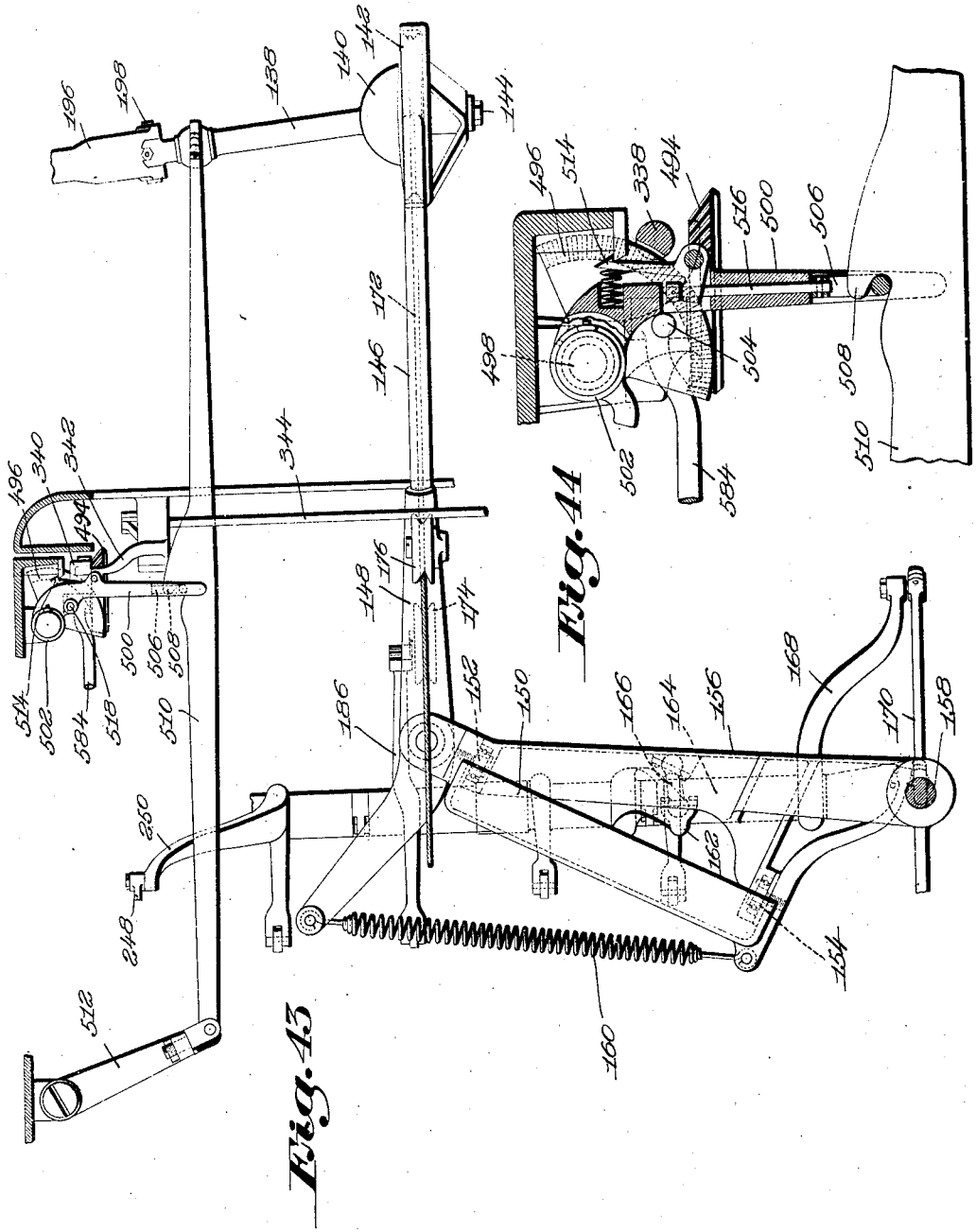

Patented Oct. 30, 1928.

1,689,594

UNITED STATES PATENT OFFICE.

ALFRED R. MORRILL, OF SWAMPSCOTT, MASSACHUSETTS, ASSIGNOR TO UNITED SHOE MACHINERY CORPORATION, OF PATERSON, NEW JERSEY, A CORPORATION OF NEW JERSEY.

SHOE MACHINE.

Application filed February 2, 1920, Serial No. 355,583. Renewed January 20, 1928.

This invention relates to shoe machines and more particularly to machines for operating upon shoes of the type which comprise a shoe supporting jack and in which the shoe and the means for operating upon the shoe are moved relatively to transfer the point of operation about the shoe and in which mechanism is provided for changing the relative position of the operating means and the shoe to cause the shoe to be presented properly to the operating means as such point is transferred about the shoe.

One object of the invention is to improve the construction and mode of operation of shoe machines of the type above referred to and to produce an efficient machine particularly adapted for performing certain classes of work.

Another object of the invention is to produce a shoe machine of the type above referred to having mechanism for moving the jack out of operating position at the completion of an operation on the shoe in which the work engaging parts of the machine are positioned so that they furnish no obstruction to this movement of the jack.

Another object of the invention is to produce a machine of the type above referred to which is adapted to perform the operation of trimming the inseam of a Goodyear welt shoe.

Another object of the invention is to produce a machine for trimming the inseams and beating out the welts of shoes in one operation with the least possible expenditure of labor and time on the part of the operator and with the exercise of very little skill.

Other objects of the invention are to produce an improved mechanism for grinding the edge of the trimming knife of an inseam trimming or analogous machine and to improve the construction and mode of operation of machines for trimming the inseams of shoes or for beating out the welts of shoes or for performing both of these operations.

With the above objects in view, the present invention consists in the combinations, constructions and arrangement of parts hereinafter described and claimed.

The several features of the present invention are intended primarily for use in machines in which the shoe is supported in operating position in the machine and all of the relative movements of the shoe and operating means are effected and controlled by automatically acting mechanisms. Certain features of the invention, however, are not limited to machines which are wholly automatic. Also certain features of the invention may be embodied with advantage in machines for operating upon shoes in which the shoe is held and manipulated by the operator.

Certain features of the invention also may be embodied in machines for trimming the inseams of shoes without beating out the welts, while other features may be embodied in machines for beating out the welts without trimming the inseams.

The invention will be readily understood from the accompanying drawings illustrating the invention in its preferred form and from the following detailed description of the constructions therein shown.

Figure 11:
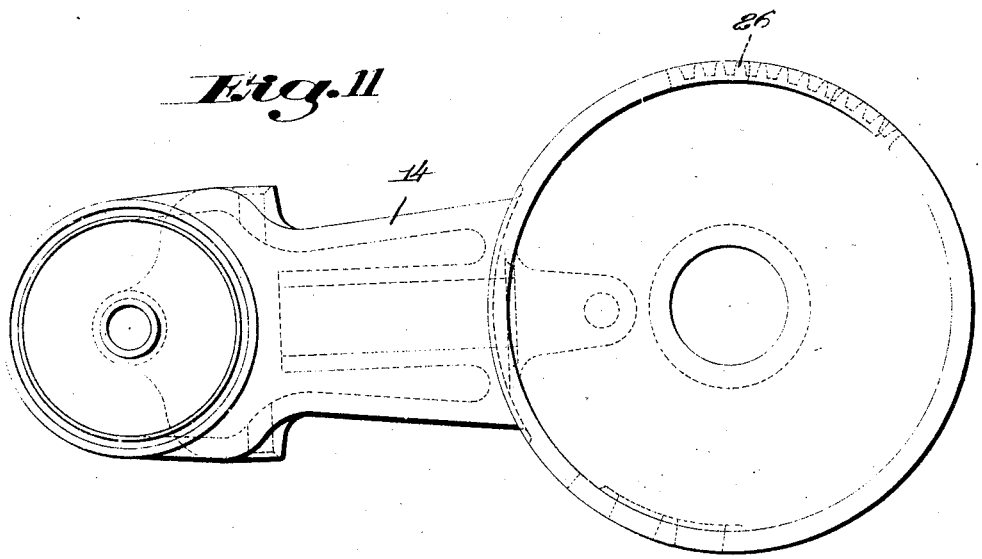
Figure 31:
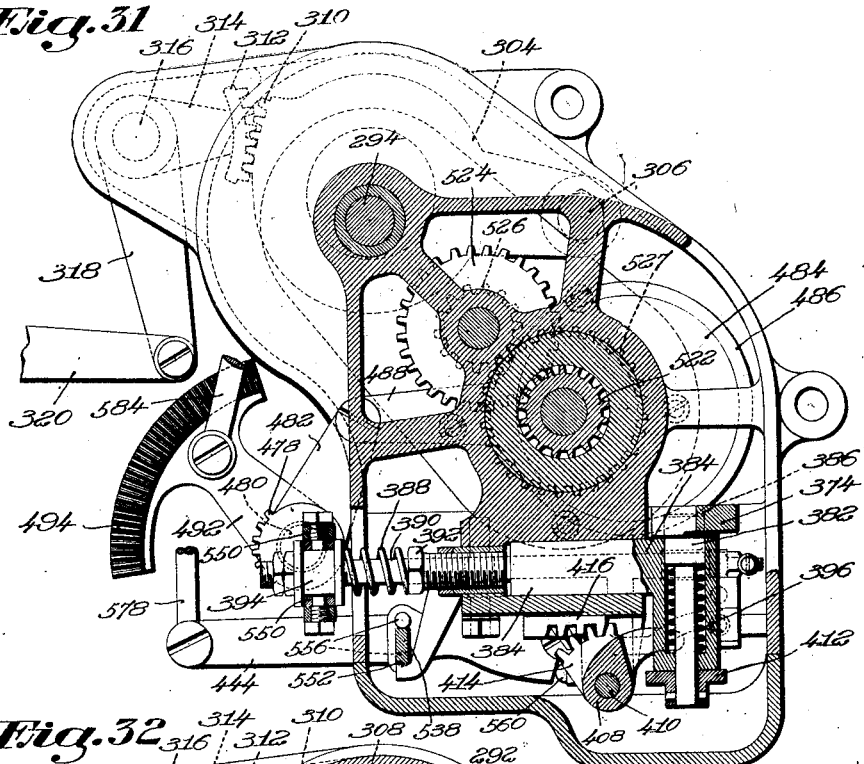
Figure 32:
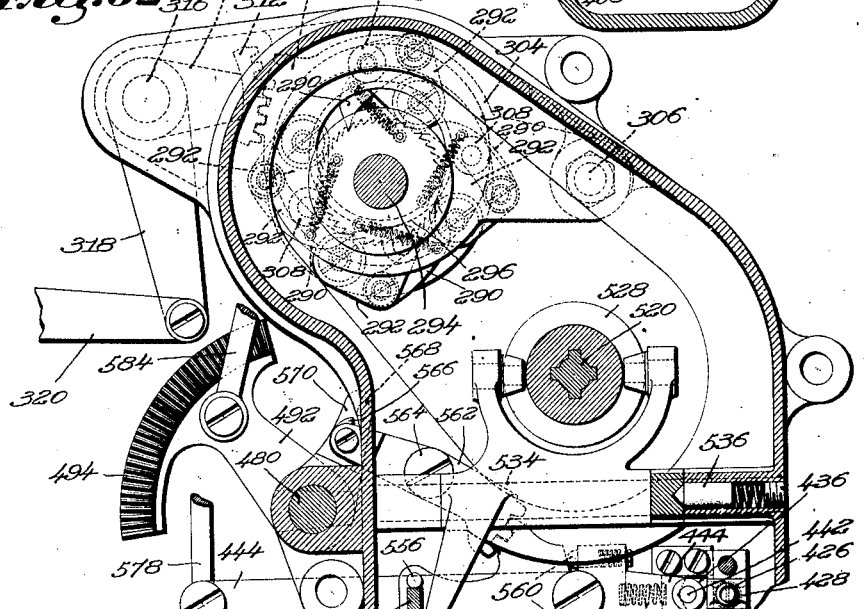
Figure 40:
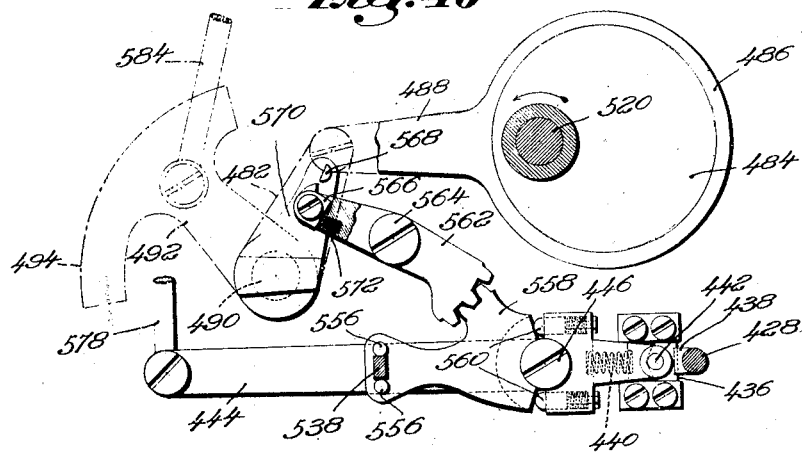
Figure 41:
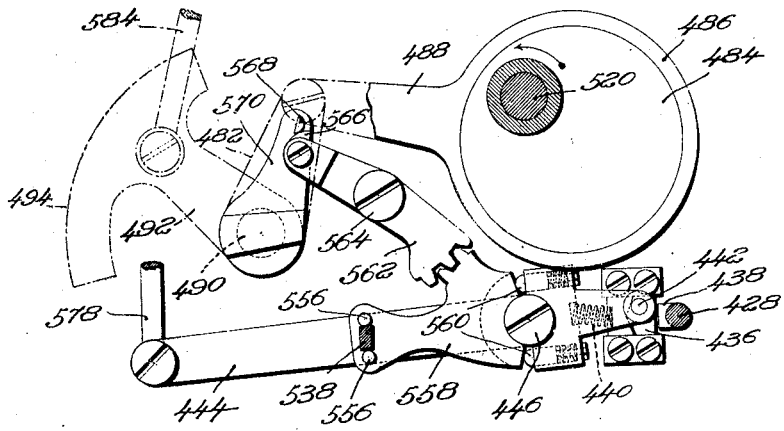
Figure 42:
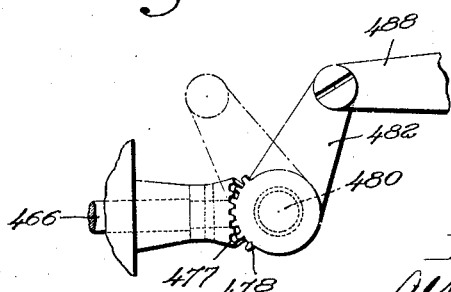

In the drawings Figure 1 is a view in front elevation of a machine embodying the invention; Fig. 2 is a view in side elevation of the machine taken from the left in Fig. 1; Fig. 3 is a view in front elevation of the inseam trimming and welt beating head of the machine which, for convenience, will be hereinafter referred to merely as the head of the machine; Fig. 4 is a view in side elevation of the head of the machine looking from the right; Fig. 5 is a view in side elevation of the head of the machine with a portion of the casing cut away; Fig. 6 is a detail view taken substantially on the line 6—6 of Fig. 5; Fig. 7 is a view in vertical section of the head of the machine; Fig. 8 is a sectional view of the head taken substantially on the line 8—8 of Fig. 5; Fig. 9 is a sectional view of the head taken substantially on the line 9—9 of Fig. 5; Fig. 10 is a detail plan view of the knife carriage; Fig. 11 is a detail view in side elevation of the knife carriage; Fig. 12 is a view in side elevation of the trimming knife; Fig. 13 is a view in front elevation partly in section of the trimming knife; Fig. 14 is a detail view of the channel guide roll supporting and actuating mechanism taken in a direction substantially perpendicular to the axis of the roll; Fig. 15 is a view of the mechanism shown in Fig. 14 taken in the direction of the axis of the roll; Fig. 16 is a detail sectional view illustrating a portion of the mechanism shown in Fig. 14; Fig. 17 is a detail sectional view taken substantially in a plane through the axis of the grinding wheel shaft; Fig. 18 is a detail sectional view taken substantially on the line 18—18 of Fig. 17; Fig. 19 is a detail view in rear elevation illustrating a portion of the head of the machine; Fig. 20 is a detail view illustrating a portion of the mechanism shown in Fig. 5 with the parts in different positions; Fig. 21 is a sectional view taken substantially on the line 21—21 of Fig. 20; Figs. 22 and 23 are detail views illustrating certain of the parts shown in Fig. 20 detached from the machine; Figs. 24 and 25 are detail views illustrating a bracket forming a part of the frame of the machine; Fig. 26 is a plan view with certain parts broken away and certain parts shown in section of the portion of the machine below the head; Figs. 27 and 28 are detail plan views illustrating in different positions certain parts of the driving mechanism for the pattern cam shaft and the stopping mechanism; Fig. 29 is a view in front elevation partly in section illustrating particularly the driving connections for the machine; Fig. 30 is a view partly in side elevation and partly in vertical section of substantially the mechanism shown in Fig. 29; Fig. 31 is a detail sectional view taken substantially on the line 31—31 of Fig. 30; Fig. 32 is a detail sectional view taken substantially on the line 32—32 of Fig. 30; Figs. 33, 34 and 35 are similar views partly in front elevation and partly in section illustrating a portion of the mechanism shown in Figs. 29 and 30 with certain of the parts in different positions in the several figures; Fig. 36 is a detail plan view partly in section illustrating a portion of the mechanism shown in Fig. 33; Figs. 37, 38 and 39 are similar views in side elevation illustrating a portion of the mechanism shown in Figs. 29 and 30 with certain of the parts in different positions in the several figures; Figs. 40 and 41 are similar detail plan views partly in section illustrating in different positions certain parts of the mechanism shown in Fig. 32; Fig. 42 is a detail plan view illustrating certain of the parts shown in Figs. 3 and 4; Fig. 43 is a view in side elevation illustrating the mechanism for supporting and actuating the jack; and Fig. 44 is a detail view partly in side elevation and partly in section illustrating a portion of the mechanism shown in Fig. 43.

The machine illustrated in the drawing is constructed and arranged for trimming the inseams and beating out the welts of shoes in one operation. The machine comprises a movable jack for supporting the shoe, and during the operation of the machine movements are imparted to the jack to change the position of the shoe with relation to the inseam trimming and welt beating mechanisms as the point of operation is transferred about the shoe to present the shoe properly to said mechanism. In this machine all that is required of the operator in performing an operation upon a shoe, is to place the shoe on the jack, to insert the shoe in the machine, to start the machine and to remove the shoe from the jack after the completion of the operation. Upon the placing of a shoe on the jack, the shoe is automatically adjusted in a predetermined position with relation to the jack and is clamped in adjusted position. After the shoe is thus secured in adjusted position on the jack, the operator moves the jack to insert the shoe in the machine in proper position for beginning the operation and starts the machine. After the operation on the shoe is completed certain parts of the inseam trimming and welt beating mechanisms which engage the shoe are relatively actuated to permit the disengagement of the shoe from the machine, and the jack is automatically moved out of operating position to disengage the shoe from the machine, and then is restored to its original position. As the jack is thus returned the parts of the jack are automatically actuated to unclamp the shoe and restore the parts of the jack to their initial conditions so that after the jack comes to rest the shoe may be lifted from the jack. When the jack has been restored to its original position the machine is stopped automatically. Thus when the machine is finally stopped after the completion of an operation and the shoe is removed from the jack the parts are all in position for the reception of another shoe.

The present machine comprises a rotary crown shaped trimming knife indicated at 2 (Figs. 2, 3, 5, 12 and 13) and is provided with a series of guides for determining the position of the shoe with relation to the knife edge at the point of operation of the knife. These guides (see Fig. 5) include a crease guide 4 for engagement in the crease between the welt and the upper, a channel guide 6 consisting of a roll having a conical lower end for engagement in the channel of the insole, and a guide 8 arranged to engage the inner edge of the welt and hold it up to the knife.

The trimming knife is mounted on a sleeve 10 journaled on a shaft 12 secured in an adjustable carriage 14 and is driven from a shaft 16 which constitutes the main shaft of the head of the machine through bevel gears 18 and 19 mounted respectively on the sleeve 10 and on a shaft 20 journaled in the knife carriage, a second bevel gear 21 mounted on said shaft and a bevel gear 22 mounted on the main shaft 16. The knife carriage 14 is mounted for adjustment to adjust the knife radially so as to regulate the depth of cut and also to adjust the knife in a direction substantially parallel with the lower side of the knife to compensate for the grinding away of the knife edge. The rear part of the knife carriage is cylindrical, as clearly shown in Figs. 10 and 11, and engages in a cylindrical bearing in the frame, as shown in Fig. 9. The cylindrical portion of the knife carriage may be turned in its bearing in the frame to adjust the knife radially by means of a spiral pinion 23 mounted on a shaft 24 and engaging spiral gear teeth 26 formed on the knife carriage. The shaft 24 engages in bearings in the frame and carries at its forward end a milled hand wheel 27. The shaft 24 is held in adjusted position by means of a lock nut 28 threaded thereon.

The knife is adjusted in a direction substantially parallel with its lower side by adjusting the knife carriage longitudinally of its pivotal axis. This adjustment of the knife carriage is effected by means of an adjusting screw 30 engaging in a bearing in the frame and threaded into the knife carriage. The teeth 26 on the knife carriage are so formed that during this latter adjustment of the carriage the cylindrical part of the carriage is turned in its bearing in the frame so that the resultant adjustment of the knife is in a direction substantially parallel with its lower side. In order to hold the knife carriage in adjusted position a clamping bolt 32 is passed through a slot in the knife carriage and through an opening in the frame, and a clamping nut 34 having an operating handle is threaded on the lower end of the bolt.

The roll 6 is rotated so that it tends to feed the shoe. The roll is mounted on the lower end of a shaft 36, (see Figs. 5, 7, 14 and 15) journaled in a bearing in a hanger 38 pivoted on bearing pins 40 to swing about a horizontal axis. The shaft 36 carries a gear 41 meshing with a gear 42 mounted on the lower end of a shaft 44 journaled in the hanger 38. The shaft 44 is connected at its upper end by a universal joint 46 with the lower end of a shaft 48 journaled in a bearing in the frame. To the upper end of the shaft 48 is secured a spiral gear 50 meshing with spiral gear teeth 52 formed on a double gear wheel 54 mounted on the main shaft 16. The mounting of the hanger 38 upon the bearing pins 40 allows the roll 6 to move toward and from the crease guide 4 in accordance with variations in the thickness of the material between the roll and the guide. During the normal operation of the machine the hanger 38 is acted upon by a coiled spring 56 connected with a rearwardly extending arm 58 on the hanger which tends to swing the hanger in a direction to force the roll 6 toward the crease guide 4 so as to maintain the roll and guide in guiding engagement with the shoe.

The crease guide 4 constitutes the welt support of the welt beating devices and is held stationary in engagement with the grain side of the welt during the normal operation of the machine. The welt is beaten out as it is advanced across the upper surface of the guide 4 by means of a vibratory beater 60 which acts on the flesh side of the welt (see Figs. 5 and 7) and is formed on the forward end of a lever 62 pivoted on a stud 64. The rear end of the lever 62 is connected by means of a link 66 with the lower end of an actuating lever 68 pivoted at 70 on the frame. The upper end of the lever 68 embraces a three point cam 72 mounted on the main shaft 16. The parts are constructed and arranged so that during the swinging movement of the lever 68 in each direction the median line of the lever or the line connecting the center of the pivot 70 with the center of the pivotal connection between the link 66 and the lever 68 is carried from a position on one side of the center of the pivotal connection between the link 66 and the lever 62 to a position on the other side of said center. With this construction the beater 60 is very rapidly vibrated even with a relatively low speed of rotation of the main shaft 16. The welt beater 60 acts on the welt close to the edge of the trimming knife and its lower face projects below the line of cut so that the beater constitutes an effective guard to hold the inseam stitches away from the knife.

The machine is provided with a rotary grinding disk or wheel 74 for sharpening the cutting edge of the knife. The grinding wheel is mounted so that it may be moved into and out of operative position with relation to the knife. (See Figs. 5, 7, 8, 17, 18 and 19.) The grinding wheel is secured to the forward end of a shaft 76 (see Fig. 17) journaled by means of ball bearings 78 in a sleeve 80 and held against rearward end thrust by means of a ball thrust bearing 82. The sleeve 80 is mounted for longitudinal movement in bearings in the frame to carry the grinding wheel into and out of position to engage the knife edge. The mechanism for adjusting the sleeve longitudinally comprises a rod 84 secured to the rear end of the sleeve and a spiral pinion 86 journaled in bearings in arms 88 on the frame and threaded on the rod. The pinion 86 is engaged by a corresponding pinion 90 mounted on the inner end of a shaft 92 engaging in bearings in the frame to the outer end of which is secured a hand wheel 94 by which the shaft may be rotated manually to adjust the sleeve 80.

The shaft 76 is continuously driven from the main shaft 16 when the grinding wheel is in operation. The driving connections for the shaft 76 are arranged, however, so that they may be disconnected when the grinding wheel is out of operation. These driving connections comprise a gear 96 secured to the shaft 76 and meshing with a gear 98 (Fig. 8) secured to a shaft 100 journaled in a hanger 102 and a spiral gear 104 secured to the shaft 100 and arranged to mesh with spiral gear teeth 106 formed on the gear wheel 54 (Fig. 7). To enable the gear 104 to be moved into and out of engagement with the gear teeth 106, the hanger 102 is pivoted to swing on bearings formed by the forward and rear portions of the sleeve 80 (see Figs. 8 and 17). To the central portion of the hanger is secured an arm 108 carrying a gear segment 110 which meshes with a gear segment 112 formed on a lever 114 secured to the inner end of a stud 116. The lever 114 is acted upon by a coiled spring 118 which tends to swing the same in a direction to depress the outer portion of the hanger 102 and thereby disengage the gear 104 from the gear teeth 106. To the outer end of the stud 116 is secured a manually operable arm 120 by means of which the parts may be actuated to engage the gear 104 with the gear teeth 106.

The grinding wheel is constructed and arranged to grind the knife on a substantially straight bevel. The grinding wheel is cylindrical in form and is provided with a cylindrical recess, the wheel being constructed and arranged so that the end of the peripheral wall of the wheel engages the knife, as shown clearly in Fig. 7. The end of this wall of the wheel is bevelled off, as shown in this figure and in Fig. 17.

The framework of the present machine is constructed so as to form a casing enclosing substantially all of the parts embodied in the head of the machine, as clearly shown in the drawing. The knife carriage is constructed so as to enclose the driving connection intermediate the gear 21 and the knife (see Figs. 3 and 7), and the hanger 38 is formed with a circular projection 121 covering the knife edge and forming a guard for the knife. The edge of the knife is exposed only at the operating point so that there is very little liability of the operator being injured by it. The framework of the machine is formed with a passage-way 123 leading from the point of engagement of the grinding wheel with the knife to conduct away the dust generated when the knife is being ground. (See Figs. 3, 5, 9, 24 and 25.) This passage-way is extended to the rear of the head of the machine and a suitable suction fan may be connected with the rear end thereof to draw the dust through the same.

The driving mechanism for the main shaft 16 (see Figs. 29 and 30) comprises a driving shaft 122 adapted to be connected at its upper end with a suitable power shaft and carrying a driving member 124 of a friction clutch. The driven member of the clutch indicated at 126 is carried by a sleeve 128 loosely mounted on the shaft. The sleeve 128 also carries a spiral gear 130 which meshes with a spiral gear 132 fixed to the main shaft 16. During the operation of the machine in trimming the inseam and beating out the welt of a shoe the members 124 and 126 of the main driving clutch are engaged and the main shaft 16 is driven through the spiral gears 130 and 132 at a speed dependent upon the speed of the driving shaft 122.

The jack for supporting the lasted shoe during the operation of the machine (see Figs. 1 and 2) comprises a heel support 134 and a toe rest 136 mounted upon a spindle 138. The lower end of the jack spindle is secured to a hemispherical shell or casing 140 connected by means of a gimbal joint with a wheel 142 mounted to rotate on a vertical stud 144. The stud 144 is secured in a casing carried at the forward ends of supporting arms 146, (see Figs. 26 and 43) the rear ends of which are secured in a carrier 148 pivoted to swing vertically at the upper end of a support 150. The support 150 is pivoted at 152 and 154 on a second support 156 to swing laterally of the machine. The support 156 is mounted on pivot studs 158 to swing forwardly and rearwardly. The jack spindle is yieldingly supported vertically by means of a coiled spring 160.

During the operation of the machine on the shoe the shoe is held positively to the machine at all times by the guides engaging the shoe at the point of operation and, chiefly, by the action of the channel guide roll 6 and the crease guide 4. Relatively slight vertical movements to compensate for the transverse curvature of the shoe bottom are imparted to the jack and the shoe by the cooperative action of the spring 160 and the guides engaging the shoe, the upward thrust of the jack under the force of the spring 160 being resisted by the channel guide roll 6, so that the inner surface of the sewing rib and the bottom of the channel of the shoe sole are maintained in contact with the channel guide roll throughout the inseam trimming and welt beating operation. Tipping and turning movements are imparted to the shoe to change the relative positions of the shoe and the devices for operating upon it to compensate for the longitudinal and transverse surface curvatures and the edge curvature of the shoe sole as the point of operation of the operating devices is transferred about the shoe. The required tipping movements are imparted to the jack and thereby to the shoe by devices acting on the jack spindle to move the lower end of the spindle in horizontal directions forwardly, rearwardly and laterally of the machine, and the turning movements are imparted to the shoe by devices acting on the jack spindle to rotate it. Because of the fact that the shoe is held at all times at the point of operation by the guides engaging the shoe, the tipping and turning movements are caused to take place about these guides as a fulcrum, or about the point of operation. The principal guide controlling the position of the shoe and furnishing a fulcrum for the tipping and turning movements is the channel guide roll 6 against which the bottom of the channel and inside surface of the sewing rib are held throughout the operation of the machine, as stated above, the upward and inward pressure against the crease guide 4 being merely sufficient to retain the guide in the crease without liability of injury to the shoe upper or displacement of the shoe or inseam.

The support 156 is swung forwardly and rearwardly to impart lateral tipping movements to the shoe by means of a cam lever 162 pivoted on a shaft 164 and a ball-ended link 166 connecting one arm of the lever with the support 156. The support 150 is swung laterally to impart longitudinal tipping movements to the shoe by means of a cam lever 168 pivoted on the shaft 164 and a link 170 connecting one arm of the cam lever with an arm on said support. The wheel 142 is rotated to impart lateral turning movements to the jack by means of a cable 172 passing about the wheel, about guide pulleys 174 and 176 mounted on the carrier 148 and over a stationary guide pulley 178. One end of the cable is secured to a pulley 180 mounted to rotate on a stud 182, and to the other end of the cable is attached a weight 184. The rotative movements of the pulley 180 are produced and controlled by means of a cam lever 186 pivoted on the shaft 164 through a gear segment 188 and a gear 190. Each of the cam levers 162, 168 and 186 carries a cam roll arranged to engage the periphery of one of a series of cam disks mounted on a shaft 192 which, for the sake of convenience, will be hereinafter termed the pattern cam shaft.

The jack of the present machine has the same construction, arrangement and mode of operation of parts as the jack illustrated and described in the pending application of Laurence E. Topham, Ser. No. 269,076, filed December 31, 1918. The jack illustrated in the drawing (see Fig. 1) is constructed and arranged so that upon the placing of the shoe on the jack the shoe is automatically located in a predetermined and unvarying position lengthwise of the jack regardless of the size of the shoe placed on the jack and is securely clamped in adjusted position, and that at the completion of the operation on the shoe, the shoe is unclamped and the parts of the jack are restored to their initial positions ready for the application of another shoe to the jack. The shoe is gaged with relation to the jack from the forward point in the bulge in the toe portion of the upper of the shoe. The jack comprises the supporting spindle 138, an arm 194 secured rigidly to the spindle, upon the upper end of which the toe rest 136 is mounted, an arm 196 pivoted at 198 to the central portion of the jack frame, and a lever 200 pivoted at 202 on the arm 196 and having the heel support 134 consisting of a last pin mounted thereon. The arm 196 is acted upon by a coiled spring 204 which tends to swing the same toward the arm 194. The spring 204 is attached at one end to a pin mounted in a lever 206 pivoted on the arm 196 and connected with the lever 200 through intermeshing gear teeth. The spring 204 thus tends to swing the lever 200 in a direction to depress the toe of the shoe. Before a shoe is placed on the jack preparatory to starting an operation the arm 196 is held in a position relatively remote from the arm 194 against the tension of the spring 204. The mechanism for holding the arm 196 in this position comprises a lever 208 pivoted at 210 on the jack-frame, a toggle 212 connecting the lever 208 with the arm 196, a lever 214 also pivoted at 210 and carrying an abutment screw arranged to engage the lever 208, a bevel gear 216 meshing with a gear segment 218 formed on the lever 214, a shaft 220 to which the gear 216 is secured passing centrally through the spindle 138 and a gimbal joint connecting the lower end of the shaft 220 with the stud 144 which holds the shaft from turning movement. Before a shoe is applied to the jack the toggle 212 is in a straightened condition so as to hold the arm 196 in position. Upon the placing of the shoe on the jack the toggle 212 is broken by the depressing movement imparted to a vertically movable pin 222 engaged by the last which operates through suitable connections to swing the outer member of the toggle upwardly. The pin 222 is depressed by the engagement of the last therewith as the last pin is seated in the last pin hole. The breaking of the toggle allows the spring 204 to act to swing the arm 196 toward the arm 194. The swinging movement of the arm 196 brings the toe of the shoe into engagement with the upper face of the toe rest which is inclined so that the toe of the shoe is lifted as it slides along this surface, thereby swinging the lever 200 relatively to the arm 196 and bringing the spring 204 into action on said lever. Thus when the shoe is finally located on the jack and the swinging movement of the arm 196 ceases, the spring 204 acts to maintain the shoe in adjusted position longitudinally of the jack, and the tendency of the spring to tilt the lever 200 in a direction to depress the toe of the shoe clamps the shoe firmly on the jack.

When the toe of the shoe reaches a predetermined position with relation to the jack the swinging movement of the arm 196 under the action of the coiled spring 204 is positively arrested. The mechanism for stopping the swinging movement of the arm comprises a bar 224 pivotally connected at one end with the arm and provided with rack teeth engaging a pinion 226 journaled in the arm 194 to which is secured a ratchet wheel 228. A pawl 230 is arranged to engage the ratchet wheel 228 and is controlled through suitable connections from a feeler 232 arranged to be engaged by the toe of the shoe. When the shoe is applied to the jack and during the adjusting movement of the shoe, the pawl 230 is held out of engagement with the ratchet wheel 228, allowing the ratchet wheel to rotate freely. When the bulge in the toe portion of the upper engages the feeler 232, the pawl 230 is released and engages the ratchet wheel 228, thereby stopping the swinging movement of the arm 196.

During the turning movement imparted to the jack in an operation on the shoe the toggle 212 is straightened by the action of the gearing connecting the toggle and the stud 144. During the turning movement in the reverse direction imparted to the jack in restoring the same to starting position after the completion of the operation, the toggle 212 is actuated to swing the arm 196 back to the position shown in Fig. 1, thereby unclamping the shoe so that it is free to be lifted from the jack.

The shoe is fed during the operation by the rotary movement of the roll 6 and by mechanism acting to impart shoe feeding movements to the jack. The mechanism for actuating the jack to impart feeding movements to the shoe (see Figs. 1 and 26) comprises a lever 234 pivoted at 236 on the frame and a link 238 connecting said lever with the toe end of the jack. During the operation on the shoe the feeding lever 234 is swung toward the left to actuate the jack to advance the marginal portion of the shoe bottom past the trimming knife and welt beating devices at substantially the same speed as the peripheral speed of the feeding roll 6. The mechanism for actuating the feeding lever comprises an arm 240 pivoted at 242 on the frame and pivotally connected links 244 and 246 connecting the arm 240 with the feeding lever. The arm 240 is actuated through a link 248 from a cam lever 250 pivoted on the shaft 164 and carrying a cam roll arranged to engage the periphery of a cam disk mounted on the cam shaft 192. The path of the connection between the links 244 and 246 is controlled by an arm 252 pivoted at 254 on a lever 256 hereinafter termed the fulcrum carrying lever which is pivoted at 257 on the frame. During the operation of the machine the fulcrum carrying lever is locked in position. When a shoe is placed in the machine, however, the fulcrum carrying lever is unlocked and is free to be adjusted in accordance with the size of the shoe. The feeding lever 234 and the fulcrum carrying lever are acted upon by a cable 258 attached at one end to the feeding lever and passing about a pulley 260 mounted coaxially with the lever 256, about a pulley 262 mounted on said lever, and over a pulley 264 mounted on the frame, the cable having a weight 266 attached to the outer end thereof which exerts a constant pull on the cable. This weight eliminates back lash in the parts of the jack actuating feeding mechanism and maintains the cam roll on the cam lever 250 in engagement with the periphery of the actuating cam disk.

The amplitude of movement imparted to the feeding lever 234 is adjusted in accordance with the size of the shoe to be operated upon by the placing of the shoe in position in the machine to start the operation. In changing from one size of shoe to a smaller size, the fulcrum carrying lever 256 is swung to the left, while in changing from one size of shoe to a larger size the fulcrum carrying lever is swung to the right. The adjustment of the controlling arm 252 produced by the adjustment of the fulcrum carrying lever adjusts the amplitude of movement imparted to the feeding lever for the size of the shoe to be operated upon.

In order that the jack actuating feeding mechanism may operate to advance the marginal portion of the shoe bottom past the operating devices always at the same uniform rate as the peripheral speed of the roll 6, the speed of the pattern cam shaft is adjusted in accordance with the size of the shoe to be operated upon. This adjustment of the speed of the pattern cam shaft is effected upon the depression of the treadle to start the machine by mechanism controlled from the fulcrum carrying lever.

The mechanism for driving the pattern cam shaft (see Figs. 1, 26, 29, 30 and 32) comprises a gear 268 secured to the upper end of said shaft and arranged to be driven from a gear 270 formed on the lower end of a sleeve 272 through a train of gears 274, 276, 278, 280, 282 and 284. The sleeve 272 is driven from a ratchet wheel 286 mounted on a shaft 288 through a series of pawls 290 mounted on oscillatory levers 292 carried by the sleeve. The shaft 288 is driven from a shaft 294 through intermeshing clutch members 296 and 298, the upper member of which is keyed to the shaft 294 and is held in engagement with the clutch member 298 by springs 300. To the upper end of the shaft 294 is secured a spiral gear 302 meshing with the spiral gear 130 through which the shaft 294 is driven in timed relation to the main shaft 16.

The oscillation of the pawl carrying levers 292 is controlled by means of a ring 304 pivoted at 306 on the frame and formed with a groove in which engage rolls 308 carried by the levers. The position of the ring is controlled through intermeshing gear segments 310 and 312 from an arm 314 secured to a rock shaft 316. To this rock shaft is also secured a second arm 318 to which is pivoted one end of a longitudinally movable controller bar 320. The other end of the controller bar is movably supported by a link 322 and a lever 324 pivoted on a stud 326. The latter end of the controller bar is formed with oppositely inclined surfaces 328 leading to a recess 330 adapted to receive a roll 332 mounted on the fulcrum carrying lever 256. When the machine is at rest the controller bar 320 is held in its rearward position by the action of a spring 334, as shown in Fig. 26. Upon the depression of the starting treadle the controller bar 320 is swung forwardly to engage the roll 332 in the recess 330 by means of one or more pins 336 mounted on a longitudinally movable bar 338 and arranged to engage the lever 324.

The bar 338 is mounted to slide longitudinally in suitable guides, and the left hand end thereof is connected by a link 340 with one arm of a bell crank lever 342. The other arm of the bell crank lever is connected by a treadle rod 344 with a pivoted starting treadle 346. The starting treadle is normally held in elevated position by means of a coiled spring 348. Through the connections described, upon the depression of the treadle the bar 338 is moved longitudinally to the right, this movement of the bar operating to cause the engagement of the members 124 and 126 of the main driving clutch to start the machine in the manner hereinafter described. After the machine is started the treadle is released and is moved upwardly by the action of the spring 348, and the bar 338 is moved back to the left to its normal position. During the movement of the bar to the right the lever 324 is actuated to swing the controller bar 320 forwardly.

Before the depression of the treadle to start the machine the shoe is placed in the machine in the correct position for the starting of the operation, thereby adjusting the fulcrum carrying lever 256 in accordance with the size of the shoe. When the controller bar 320 is swung forwardly, through the engagement of the bar with the roll 332, the bar is adjusted longitudinally in a position corresponding with the position of the fulcrum carrying lever 256 and through the connections described the ring 304 is adjusted to adjust the speed of the cam shaft 192 in accordance with the size of the shoe to be operated upon.

The mechanism for locking the fulcrum carrying lever 256 in position during the operation (see Fig. 26) comprises a rod 350 pivotally connected at one end with the fulcrum carrying lever, and engaging in a sleeve 352 pivoted on a stud 354, and pivoted locking levers 356 arranged to engage the rod. The locking levers are actuated to lock and release the rod 350 by the forward and rearward movement of the controller bar 320 through connections comprising a cross-bar 358, a sleeve 360, a coiled spring 362 and a rod 364.

The controller bar 320 is held in forward position during the operation on the shoe by means of a spring actuated pivoted latch 366. As the lever 324 is actuated to swing the controller bar 320 forwardly upon the depression of the treadle, the latch 366 engages a projection on said lever and holds the same in position when the bar 338 returns to its initial position upon the release of the treadle. The latch 366 holds the lever 324 and the controller bar in position during the operation on a shoe and also after the completion of the operation until another shoe is placed on the jack. Upon the placing of another shoe on the jack, the latch is thrown out allowing the controller bar to swing back to its rearward position.

After a shoe has been placed by the operator on the jack and has been adjusted in a predetermined position with relation to the jack and clamped in adjusted position automatically by the action of the jack mechanism, the operator places the shoe in the machine with the guide roll 6 located in the channel of the insole, and with the crease guide 4 engaged in the crease between the upper and the welt at the proper point for the starting of the operation and then depresses the treadle to engage the main driving clutch. While the shoe is being moved by the operator to the proper position to start the inseam trimming and welt beating operation the trimming knife is stationary and the channel guide roll 6 and the crease guide 4 are out of the operative position in which they engage the shoe, as will be hereinafter described, so that the shoe can be readily brought, by a simple movement of the jack, to the required position, where the channel can be engaged by the roll 6 and the crease between the upper and the welt can be engaged by the guide 4 without any liability of injury to the shoe. During the operation of the machine the members 124 and 126 of the main driving clutch are held in engagement and the machine is driven at a speed depending upon the speed of the driving shaft 122. When the operation is completed the members of the main driving clutch are disengaged and the machine is stopped by the automatically acting devices. The mechanism for disengaging the clutch and stopping the machine is arranged to be thrown into operation automatically at a predetermined point in the operation of the machine. The sleeve 128 (see Figs. 29 and 30) is arranged to slide longitudinally of the shaft 122 and carries a brake member 368 arranged to engage a fixed brake shoe 370. The sleeve is normally held in its upper position with the members of the clutch engaged and with the members of the brake disengaged by means of a coiled spring 372.

The mechanism for moving the sleeve 128 downwardly to disengage the clutch and engage the brake (see Figs. 29, 30, 31, 33, 34 and 35) comprises a bell crank lever 374 pivoted on a stud 376 one arm of which carries a cam roll 378 engaging in a cam groove 380 in the sleeve. A locking pin 382 is mounted to slide longitudinally in a carrier 384 and is arranged to engage in a recess 386 in the other arm of the bell crank lever. The carrier 384 is mounted to slide longitudinally in suitable guides and is acted upon by a coiled spring 388 surrounding a rod 390 which forms part of the carrier and interposed between the outer end of an adjustable screw threaded sleeve 392 through which the rod slides and a flanged sleeve 394 mounted on the rod. The spring 388 normally holds the carrier in position with a shoulder on the carrier in engagement with the inner end of the sleeve 392. The locking pin 382 is acted upon by a coiled spring 396 which tends to move the same rearwardly into engagement with the bell crank lever 374. During the normal operation of the machine, however, the locking pin is held out of engagement with the bell crank lever so that the lever is oscillated idly by the action of the cam groove 380. In stopping the machine the locking pin 382 is released and is actuated by the spring 396 to engage the same in the recess in the bell crank lever 374, thus locking the lever to the carrier 384. The parts are preferably constructed and arranged so that the locking pin will engage in the recess 386 in the arm of the bell crank lever when the cam roll 378 is in the upper idle portion of the cam groove 380. After the carrier 384 is thus locked to the bell crank lever by the locking pin, as the cam roll 378 reaches a downward throw in the cam groove 380, the bell crank lever is swung in a direction to move the carrier longitudinally to the right against the tension of the spring 388. The cam roll then passes into the lower idle portion of the cam groove, and when the machine arrives substantially at stopping position the cam roll engages in an upward throw in the cam groove. When this occurs the sleeve 128 is moved downwardly to disengage the main driving clutch and engage the brake. In order to render this upward throw in the cam groove effective to move the sleeve downwardly, the latch lever 398 is provided to prevent the return of the carrier 384 to its normal limiting position after it is moved longitudinally to the right in the manner described. The latch lever 398 is pivoted on a stud 400 and is provided with a projection 402 for engagement with a projection 404 on the carrier 384. The latch lever is normally held in lowered position substantially as shown in Fig. 34, and is acted upon by a coiled spring 406 which tends to swing the same upwardly into acting position. As the carrier 384 is moved to the right, the latch lever is swung upwardly into the position shown in Fig. 35. As the carrier moves back to the left during the passage of the cam roll through the upward throw in the cam groove 380, the latch lever arrests the return movement of the carrier before the carrier reaches its normal limiting position as shown in Fig. 33. Upon the stopping of the return movement of the carrier the sleeve 128 is moved downwardly to disengage the clutch and engage the brake.

The locking pin is normally held in forward position by means of a bell crank lever 408 pivoted on a stud 410 and arranged to engage a collar 412 secured to the locking pin. The lever 408 carries a gear segment 414 which meshes with a gear segment 416 carried by a lever 418 pivoted on a stud 420. The lever 418 is pivotally connected by means of a pin 422 with the upper end of a vertically movable rod 424. This rod also controls the position of the latch lever 398 through the engagement of the rear end of the pin in a slot in the latch lever. In starting the machine the rod 424 is depressed by the operator, and in stopping the machine the rod is released and is then moved upwardly by the action of the coiled spring 426. When the rod is depressed the lever 408 is actuated to move the locking pin forwardly out of locking engagement with the bell crank lever 374, allowing the sleeve 128 to be moved upwardly by the action of the coiled spring 372 to engage the clutch and disengage the brake and the latch lever 398 is moved downwardly out of acting position, allowing the carrier 384 to be moved to the left into its normal position by the action of the coiled spring 388. The release of the rod 424 and the upward movement thereof on stopping the machine releases the locking pin 382 and the latch lever 398.

The rod 424 is pivotally connected with a second vertically movable rod 428 which carries at its lower end a collar 430 arranged to be engaged by a lever 432 pivoted at 434 on the frame. The lever 432 is engaged by the right hand end of the bar 338 as said bar is moved to the right by the depression of the treadle and the lever is thereby actuated to depress the rods 428 and 424. The rods are held in depressed position during the operation on the shoe by means of a latch 436 arranged to engage a projection 438 on the rod. The latch is slidably mounted in guides and is acted upon by a coiled spring 440 which tends to advance the same into acting position. The stopping devices are thus held out of operation by the latch 436 after the starting of the machine, allowing the treadle to be released and the bar 338 to be moved back to its normal position.

When the operation of the machine is completed the latch 436 is automatically disengaged from the projection 438 on the rod 428, allowing the stopping devices to be thrown into operation. The latch is provided with a V-shaped slot (see Fig. 32) in which is engaged a pin 442 mounted on a lever 444 pivoted on a stud 446. In stopping the machine at the completion of the operation the left hand end of the lever 444 is swung forwardly by automatically acting devices, thereby retracting the latch.

Upon stopping the machine at the completion of an operation on the shoe the shoe engaging guides and welt beating devices are moved relatively to permit the disengagement of the shoe from the same. To this end the roll 6 is swung forwardly and upwardly away from the crease guide 4 and welt edge guide 8 and the crease guide is swung downwardly away from the beater 60. The arm 58 on the hanger 38 is arranged to be engaged by a hook 448 (see Figs. 5 and 6) formed on the upper end of a bar 450, the lower end of which is pivotally connected with one arm of a bell crank lever 452 secured to one end of a rock shaft 454. The crease guide 4 is formed at the forward end of a lever 456 pivoted on the stud 64. The position of the lever 456 is controlled by means of a toggle consisting of pivotally connected links 460 and 462 of which the link 460 is pivotally connected with the lever 456 and the link 462 is rigidly secured to the rock shaft 454. During the normal operation of the machine the lever 452 is held stationary with the hook 448 above the upper side of the arm 58 and with the toggle 460—462 in a straightened condition as shown in Figs. 5 and 7, so that the roll 6 is free to move toward and from the crease guide 4 under the influence of the spring 56 and the crease guide is held rigidly in position. Upon stopping the machine, however, the lever 452 is actuated to depress the bar 450, thereby swinging the hanger 38 to move the roll 6 into the position shown in dot and dash lines, Fig. 5, and breaking the toggle 460—462, as shown in Fig. 20, thereby actuating the lever 456 to depress the crease guide 4. The mechanism for thus actuating the lever 452 comprises a rock shaft 466, an arm 468 secured to one end of the rock shaft, a lever 470 loosely mounted on the rock shaft, and a link 472 connecting the latter lever with the lever 452 (see Figs. 20 to 22, inc.). The lever 470 is actuated from the arm 468 through the engagement of a projection 474 formed on the arm with projections 476 formed on the lever, the projections on the arm and the lever being relatively arranged so as to allow for considerable lost motion, as clearly shown in the drawings. The rock shaft 466 carries at its right hand end a gear segment 477 which meshes with gear teeth formed on a block 478 secured to the upper end of a rock shaft 480 (see Figs. 3, 4 and 42). The block carries an arm 482 arranged to be actuated from an intermittently operating eccentric 484 through an eccentric strap 486 and a pitman 488 (see Figs. 29, 30, 40 and 41).

During the normal operation of the machine the eccentric 484 is stationary, and upon stopping the machine the eccentric is rotated through a complete revolution. During this revolution of the eccentric the shaft 466 is turned first in a counterclockwise direction, Fig. 20, and then back in a clockwise direction to its initial position. As the shaft is turned in a counterclockwise direction the projection 474 engages the projections 476 and the lever 470 is swung with the shaft. This movement of the lever actuates the lever 452 to move the channel guide roll 6 away from the crease guide and welt edge guide and to depress the crease guide. To hold the channel guide roll and the crease guide in position as the rock shaft 466 is turned back in a clockwise direction the lever 470, after being swung by the counterclockwise movement of the shaft, is held from return movement by the engagement of the forwardly extending arm of a latch lever 489 (see Figs. 5 and 20) with the upper end of said lever. The latch lever is pivoted at 491 and is actuated to latch the lever 470 by means of a coiled spring 493.

After the guides and welt beating devices are actuated to permit the disengagement of the shoe, the jack is swung forwardly out of operating position and is held in forward position during the turning movement imparted thereto to restore the same to its initial position. The mechanism for swinging the jack forwardly out of operating position is also operated from the eccentric 484. This mechanism (see Figs. 26, 43 and 44) comprises a rock shaft 490 rigidly connected with the rock shaft 480, an arm 492 secured to the rock shaft and carrying a gear segment 494, a cooperating gear segment 496 secured to a rock shaft 498, a lever 500 mounted to turn loosely on the latter rock shaft and connected therewith by a spring 502, and a pin 504 mounted in the gear segment 496 and arranged to engage the lever 500 to swing the same forwardly. A slide 506 is mounted in the lever 500 and is arranged to engage a projection 508 formed on a bar 510 connected at its forward end with the jack and supported at its rear end by a pivoted arm 512. During the normal operation of the machine the lever is held in its rearward position as shown in Fig. 26. As the eccentric 484 is thrown into operation upon stopping the machine the lever 500 is swung forwardly during the first half revolution of the eccentric into the position shown in Figs. 43 and 44. During this movement of the lever 500 the slide 506 engages the projection 508 on the bar 510 and the bar is actuated to swing the jack forwardly out of operating position. The lever 500 after having been swung into forward position is held from return movement by means of a spring pressed latch 514. Through the action of the latch 514 on the lever 500 the jack is held in forward position during the turning movement imparted to the jack to restore the same to starting position and during the removal of the shoe from the jack. The latch is thrown out, however, when another shoe is placed on the jack allowing the lever 500 to swing back to its rearward position under the action of the spring 502. As the shoe is placed on the jack a sharp downward push or blow is delivered to the shoe to seat the last pin in the last pin hole in the last and to depress the pin 222 so as to trip the jack. This forces the shoe and jack downwardly. The downward movement thus imparted to the jack depresses the slide 506 which is connected with the latch by a rod 516 and the latch is thereby thrown out. The lever 500 is then swung back to its normal position by the action of the spring 502.

The latch 366 is thrown out to release the lever 324 and the controller bar 320 by the swinging movement of the lever 500 from its forward to its rearward position through the engagement of a spring pressed plunger 518 mounted in the lever 500 with the latch. As the latch 366 is thrown out the controller bar 320 is swung back to its rearward position and the locking devices for the fulcrum carrying lever 256 are actuated to unlock said lever.

The driving mechanism for the eccentric 484 (see Figs. 29, 30, 37, 38 and 39) comprises a shaft 520 which is driven from the shaft 122 at a relatively slow speed through gears 522, 524, 526 and 527. A clutch member 528 is splined to the shaft 520 and is arranged to engage a corresponding clutch member 530 secured to the eccentric. The position of the clutch member 528 on the shaft 520 is controlled by means of a lever 532 pivoted on a shaft 534 and normally held in position with the clutch member 528 disengaged from the clutch member 530, as shown in Figs. 37 and 38, by means of a spring pressed detention 536 (see Fig. 32). Upon stopping the machine the lever 532 is actuated to move the clutch member 528 upwardly into engagement with the clutch member 530.

The mechanism for thus actuating the lever 532 comprises a rod 538 pivotally supported upon an arm 540 secured to one end of a rock shaft 542. To the other end of the rock shaft is secured an arm 544 carrying a gear segment meshing with a gear segment carried at the end of one arm of a bell crank lever 546 pivoted at 548 on the frame (see Figs. 33 to 36, inc.). The other arm of the bell crank carries rolls 550 engaging between the flanges on the sleeve 394. Through the connections described as the lock bolt carrier 384 is moved to the right upon stopping the machine, the rod 538 is lifted and as the lock bolt carrier moves back to the left the rod is depressed. The rod is formed with a projection 552 which is normally located behind a projection 554 on the forward end of the lever 532, as shown in Fig. 37. The lower end of the rod engages between two pins 556 mounted on a lever 558 pivoted on the stud 446 above the lever 444 and normally held in central position with relation to the lever 444 by means of spring pressed plungers 560. As stated above, in stopping the machine after the completion of the operation on the shoe the left hand end of the lever 444 is swung forwardly. During this movement of the lever 444 the rod 538 and the lever 558 are held from forward movement by the engagement of the projection 552 with the projection 554. As the rod is lifted by the movement of the lock bolt carrier the projection 552 is carried above the projection 554 and the lever 558 and the rod are then swung forwardly by the action of one of the spring pressed plungers 560, thereby locating the projection 552 above the projection 554 as shown in Fig. 38. Then as the rod is depressed by the movement of the lock bolt carrier, the lever 532 is actuated by the engagement of the projection 552 with the projection 554 to engage the clutch member 528 with the clutch member 530 as shown in Fig. 39. Through the engagement of these clutch members the eccentric 484 is driven through a complete revolution before the machine finally comes to rest.

As the eccentric completes a single revolution the lever 558 and the rod 538 are swung rearwardly to disengage the projection 552 from above the projection 554, and the lever 532 is then moved back to its normal position by the action of the pin 536, thereby moving the driving clutch member 528 downwardly out of engagement with the driven clutch member 530. The mechanism for thus swinging the lever 558 rearwardly (see Figs. 40 and 41) comprises a lever 562 pivoted on a stud 564 and connected with the lever 558 through intermeshing gear teeth. The lever 562 carries a pivoted dog 566 having a projection arranged to be engaged by a stud 568 mounted on an arm 570 secured to the rock shaft 490. The dog 566 has a limited pivotal movement with relation to the lever 562 and is normally held by a spring in engagement with a stop formed on the lever as shown in Fig. 40. When the lever 558 is swung forwardly the projection on the dog 566 is carried into position to be engaged by the stud 568. As the arm 570 is swung to the left during the first part of the revolution of the eccentric, the stud 568 engages the projection on the dog and swings the dog on its axis until the stud passes by the projection. As the arm 570 swings back to the right during the last half revolution of the eccentric the stud 568 again engages the projection on the dog, as shown in Fig. 41. The engagement of the dog with the stop on the lever 562 prevents the dog from swinging under the action of the stud and the lever 562 is actuated to swing the lever 558 rearwardly to its normal position. This movement of the lever 558 swings the rod 538 rearwardly, thereby disengaging the projection 552 from above the projection 554.

The mechanism for swinging the lever 444 forwardly to stop the machine (see Figs. 26, 27 and 28) comprises a lever 572 pivoted at 574 on a bell crank lever 576 and a link 578 connecting the lever 572 with the lever 444. At a predetermined point in the operation of the machine, the outer end of the lever 572 is engaged by a contact plate 580 secured to the gear 268, as shown in Fig. 27, and is swung rearwardly. The movement of the lever 572 thus produced swings the lever 444 forwardly to stop the machine.

During the operation of the machine on the shoe the pattern cam shaft is driven through the greater portion of a revolution, and after the main driving clutch has been disengaged and the inseam trimming and welt beating mechanisms have been stopped at the completion of the operation, the pattern cam shaft is driven in the same direction as during the normal operation of the machine through the remaining part of a revolution to bring the same to its initial or starting position. During this movement of the pattern cam shaft, after the operation on the shoe has been completed, the jack is turned through half a revolution in a direction opposite to the direction in which it is turned during the normal operation to bring the jack to its initial or starting position. The pattern cam shaft is rotated through the remaining part of a revolution after the disengagement of the main clutch by the endwise movement of the lever 572 imparted thereto by the movement of the bell crank lever 576.

The bell crank lever is pivoted at 582 on the frame and is connected by a link 584 with the arm 492. Fig. 27 shows the parts in the position which they assume at the point in the operation of the machine when the main clutch is thrown out. As the arm 492 is swung forwardly the lever 572 is carried to the left beyond the projecting portion of the contact plate 580 by the movement of the bell crank lever 576 into the position shown in Fig. 28, and as the arm 492 is swung back rearwardly the lever 572 is carried to the right into the position shown in Fig. 26 by the movement of the bell crank. By the engagement of the end of the lever 572 with the contact plate during this latter movement of the lever, the gear 268 and the pattern cam shaft are turned through the remaining part of a revolution to bring the same to starting position.

The grinding tools of inseam trimming machines are often kept needlessly in operation, with the result that the knife is rapidly ground away. To lessen the tendency for this to be done, the present machine is provided with mechanism operating to swing the hanger 102 downwardly, thereby disengaging the gear 104 from the gear teeth 106 upon each stoppage of the machine. A manual operation is then required to throw the grinding wheel into operation before the machine is again started. The movement of the gear 104 into engagement with the gear teeth 106 when the machine is running would be liable to result in stripping or mutilation of the gear teeth, and also would result in considerable strain on certain of the other parts. The proper grinding of the knife usually requires that the grinding tool remain in operation during an operation on a single shoe. For these reasons, mechanism is provided for locking the hanger 102 in position while the machine is operating on a shoe. This locking mechanism comprises a lever 586 mounted to turn freely on the rock shaft 466 and carrying a gear segment 588 meshing with a gear segment 590 secured to the hanger 102. The lever 586 is provided with locking recesses 592 and 594 and a projection 596 formed on a bell crank lever 598 pivoted at 600 on the frame is arranged to engage in either of said recesses. Upon starting the machine the lever 598 is actuated to engage the projection 596 in one of said recesses as shown in Fig. 5, thereby locking the lever 586 and the hanger 102 in position, and upon stopping the machine the lever 598 is actuated to disengage the projection 596 from the recess as shown in Fig. 20, thereby unlocking the lever 586 and the hanger. When the gear 104 is in engagement with the gear teeth 106 the hanger 102 is locked in position by the engagement of the projection 596 in the recess 592, and when the gear 104 is disengaged from the gear teeth 106 the hanger is locked in position by the engagement of the projection 596 in the recess 594.

Ordinarily upon stopping the machine after the grinding wheel has been in operation, the hanger 102 will be swung downwardly to disengage the gear 104 from the gear teeth 106 by the combined action of gravity and the spring 118. To insure, however, the downward movement of the hanger upon stopping the machine, an abutment screw 602 is mounted in the lever 586 and is arranged to be engaged by the rear end of the link 472 as said link is moved rearwardly upon stopping the machine. The lever 586 will thus be actuated to swing the hanger 102 downwardly in case the hanger tends to stick in its upper position.

The above described locking mechanism prevents the gear 104 from being moved into engagement with the gear teeth 106 during the operation of the machine, and insures the maintenance of the grinding tool in operation during an entire operation on a shoe when the tool is thrown into operation.

The upper arm of the bell crank lever 598 is formed with a projection arranged to engage the lower arm of the latch lever 489.

As the lever 598 is actuated upon starting the machine, this projection engages the latch lever 489 and the latch lever is actuated to release the lever 470, allowing the hanger 38 to be swung by the action of the spring 56 to engage the roll 6 in the channel of the shoe as shown in Fig. 5, and the guide 4 in the crease between the welt and upper. This movement of the channel and crease guides into operative position takes place before the trimming knife starts to rotate and thus there is no danger of injury to the shoe before the shoe is in proper position to be operated upon.

The lever 598 is swung in a direction to lock the lever 586 and to throw out the latch lever 489 upon starting the machine from the bar 338 through a bell crank lever 604 pivoted at 606 and a link 608 connecting said lever 604 with the lever 598. The lower arm of the bell crank lever 604 extends into a slot in the bar 338 and is engaged by the bar as the bar is moved to the right upon starting the machine. The lever 598 is swung in the opposite direction upon stopping the machine by the action of a coiled spring 610.

The lever 598 is held in locking position during the operation of the machine by means of a spring pressed latch pin 612 slidably mounted in the outer end of the arm 468 and arranged to engage a lug 614 projecting laterally from the lever 598. The latch pin 612 is disengaged from the lug 614 to release the lever 598 by the movement imparted to the arm 468 upon stopping the machine.

In the machine illustrated in the present application the driving mechanism for the main shaft of the head of the machine, the shoe feeding mechanism, the driving mechanism for the pattern cam shaft, the mechanism for adjusting the speed of the pattern cam shaft, the mechanism for stopping the main shaft of the head at the completion of an operation on the shoe, the mechanism for moving the jack out of operating position and restoring the same to initial position, the driving mechanism for the eccentric, and the mechanism for turning the pattern cam shaft through the remaining part of a revolution after the completion of an operation, with the exception of certain changes fully described above, have substantially the same construction, arrangement and mode of operation as the corresponding mechanisms of the machine illustrated and described in the pending application of Laurence E. Topham and Alfred R. Morrill, Serial No. 312,366, filed July 21, 1919. For this reason, certain parts of these mechanisms have been only briefly described in the present application.

While the invention has been illustrated and described as applied to a machine for trimming the inseams and beating out the welts of shoes, it will be understood that certain features of the invention are not limited to machines for performing these operations but that they may be embodied with advantage in machines for performing other operations upon shoes. It will also be understood that the features of the invention in their broader aspects are not limited to the particular construction and arrangement of parts illustrated and described in the present application, but that these features may be embodied in any form within the scope of the claims.

Having explained the nature and object of the invention, and having specifically described a machine embodying the invention in its preferred form, what is claimed is:

1. A machine for operating on shoes having, in combination, an inseam trimming knife, guides for positioning the shoe with relation to the knife, a shoe supporting jack, mechanism for changing the relative positions of the shoe and the knife to present the shoe properly to the knife as the point of operation is transferred about the shoe, and automatic mechanism for relatively moving the guides to permit the disengagement of the shoe.

2. A machine for operating on shoes having, in combination, welt beating elements, a shoe supporting jack, mechanism for changing the relative positions of the shoe and the welt beating elements to present the shoe properly to said elements as the point of operation is transferred about the shoe, and automatic mechanism for relatively moving the welt beating elements to permit the disengagement of the shoe.

3. A machine for operating on shoes having, in combination, means for operating on a shoe comprising an inseam trimming knife and welt beating elements, guides in contact with which the shoe is moved, mechanism for changing the relative positions of the shoe and the operating means to present the shoe properly to the operating means as the point of operation is transferred about the shoe, and automatic mechanism for relatively moving the guides and for relatively moving the welt beating elements to permit the disengagement of the shoe.

4. A machine for operating on shoes having, in combination, means for operating on a shoe, a channel guide, a crease guide, and means operating upon stopping the machine for relatively moving the channel guide and crease guide away from each other to permit the removal of the shoe.

5. A machine for operating on shoes having, in combination, an inseam trimming knife, guides for positioning the shoe with relation to the knife, and mechanism operating upon stopping the machine for relatively moving the guides to permit the removal of the shoe.

6. A machine for operating on shoes having, in combination, welt beating elements, and means operating upon stopping the machine for relatively moving the welt beating elements to permit the removal of the shoe.

7. A machine for operating on shoes having, in combination, welt beating elements, and means for stopping the machine with the welt beating elements invariably in position to permit the removal of the shoe.

8. A machine for operating on shoes having, in combination, means for operating on a shoe, a shoe supporting jack, mechanism for changing the relative positions of the shoe and the operating means to present the shoe properly to the operating means as the point of operation is transferred about the shoe, a channel guide, a crease guide, and automatic means for relatively moving the channel guide and crease guide away from each other to permit the removal of the shoe.

9. A machine for operating on shoes having, in combination, means for operating on a shoe comprising an inseam trimming knife, a channel guide, a crease guide, a device cooperating with the crease guide to beat out the welt, a shoe supporting jack, mechanism for changing the relative positions of the shoe and the operating means to present the shoe properly to the operating means as the point of operation is transferred about the shoe, and means for moving the channel guide away from the crease guide and for moving the crease guide away from said beating device to permit the removal of the shoe upon the completion of the operation.

10. A machine for operating on shoes having, in combination, an inseam trimming knife, a shoe supporting jack, mechanism for changing the relative positions of the shoe and the knife to present the shoe properly to the knife as the point of operation is transferred about the shoe, guides in contact with which the shoe is moved, and means for relatively moving the guides to permit the disengagement of the shoe and for then moving the jack out of operating position.

11. A machine for operating on shoes having, in combination, an inseam trimming knife, means for actuating the knife, guides in contact with which the shoe is moved, a shoe supporting jack, mechanism for changing the relative positions of the shoe and the knife to present the shoe properly to the knife as the point of operation is transferred about the shoe, and mechanism for stopping the knife and relatively moving the guides to permit disengagement of the shoe at the completion of the operation and for then moving the jack out of operating position.

12. A machine for operating on shoes having, in combination, welt beating devices, a shoe supporting jack, mechanism for changing the relative positions of the shoe and said devices to present the shoe properly to said devices as the point of operation is transferred about the shoe, means for actuating said devices to beat out the welt, and means for stopping said devices with the same in position to permit the disengagement of the shoe therefrom and for then moving the jack out of operating position.

13. A machine for operating on shoes having, in combination, welt beating devices, means for actuating said devices to beat out the welt, a shoe supporting jack, mechanism for changing the relative positions of the shoe and the welt beating devices to present the shoe properly to said devices as the point of operation is transferred about the shoe, and mechanism for relatively moving said devices to permit the disengagement of the shoe and for then moving the jack out of operating position.

14. A machine for operating on shoes having, in combination, a rotary trimming knife, a rotary grinding tool for grinding the knife, driving mechanism for the tool arranged to be thrown into and out of operation, and means for preventing the driving mechanism from being thrown into operation or out of operation during an operation on a shoe.

15. A machine for operating on shoes having, in combination, a rotary trimming knife, a rotary grinding tool for grinding the knife, driving mechanism for the tool arranged to be thrown into and out of operation, means for locking the driving mechanism in position during the operation, of the machine, and mechanism for throwing out the locking means upon stopping the machine.

16. A machine for operating on shoes having, in combination, a rotary trimming knife, a rotary grinding tool for grinding the knife, driving mechanism for the tool arranged to be thrown into and out of operation, means for locking the driving mechanism in position during the operation of the machine, and mechanism for throwing said locking means into operation upon starting the machine.

17. A machine for operating on shoes having, in combination, a rotary trimming knife, a rotary grinding tool for grinding the knife, a shoe supporting jack, mechanism for changing the relative positions of the shoe and the knife to present the shoe properly to the knife as the point of operation is transferred about the shoe, driving mechanism for the tool arranged to be thrown into and out of operation, means for locking the driving mechanism in position during the operation of the machine, means for throwing the locking means into operation upon starting the machine, and mechanism for stopping the machine and throwing out the locking means at the completion of an operation.

18. A machine for operating on shoes having, in combination, a welt support, a lever, a welt beating device carried by the lever, an actuating lever and connections for imparting two complete oscillations to the first lever during each complete oscillation of the second lever.

19. A machine for operating on shoes having, in combination, a welt support, a welt beating device, an actuating lever and connections for imparting two beating strokes to the beating device during each complete oscillation of the actuating lever.

20. A machine for operating on shoes having, in combination, a welt support, a lever a welt beating device carried by the lever, an actuating lever, a link connecting the actuating lever with the first lever, and means for moving the actuating lever so as to carry the median line thereof on opposite sides of the center of the pivotal connection between the first lever and the link.

21. A machine for operating on shoes having, in combination, a rotary trimming knife, a rotary grinding wheel for grinding the knife, a longitudinally adjustable laterally fixed shaft upon which the wheel is mounted, a hanger pivoted to swing about the axis of the shaft, a counter-shaft mounted in the hanger, gearing connecting the shafts, a driving shaft, and gearing for connecting the driving shaft with the counter-shaft arranged to be connected and disconnected by the swinging movement of the carrier.

22. A machine for operating on shoes having, in combination, a trimming knife, means for actuating the knife, guides for positioning the shoe with relation to the knife, stopping mechanism comprising a lock bolt, a lock bolt carrier, and mechanism controlled from the movement of the lock bolt carrier for relatively moving the guides to permit the removal of the shoe upon stopping the machine.

23. A machine for operating on shoes having, in combination, a trimming knife, guides for positioning the shoe with relation to the knife, means for relatively moving the guides to permit the removal of the shoe upon stopping the machine, a latch for holding the guides relatively in position and means for releasing the latch upon starting the machine.

24. A machine for operating on shoes having, in combination, welt beating devices, means for actuating said devices to beat out the welt, mechanism for relatively moving said devices to permit the removal of the shoe upon stopping the machine, a latch for holding said devices relatively in position, and means for releasing the latch upon starting the machine.

25. A machine for operating on shoes having, in combination, welt beating devices, means for actuating said devices to beat out the welt, means for stopping the machine comprising a lock bolt, a lock bolt carrier, and mechanism controlled from the movement of the lock bolt carrier for relatively moving said devices to permit the removal of the shoe upon stopping the machine.

26. A machine for operating on shoes having, in combination, a trimming knife, guides for positioning the shoe with relation to the knife, means for relatively moving the guides to permit the removal of the shoe upon stopping the machine, and a latch for holding the guides relatively in position.

27. A machine for operating on shoes having, in combination, welt beating devices, means for actuating said devices to beat out the welt, mechanism for relatively moving said devices to permit the removal of the shoe upon stopping the machine, and a latch for holding said devices relatively in position.

28. A machine for operating on shoes having, in combination, a rotary trimming knife, guides for positioning the shoe with relation to the knife, a knife carriage pivoted eccentrically with relation to the knife on an axis substantially parallel with the axis of the knife and movable longitudinally of its pivotal axis, and means for swinging the carrier and for moving the same longitudinally of its pivotal axis to adjust the knife axially and radially.

29. A machine for operating on shoes having, in combination, a rotary trimming knife, guides for positioning the shoe with relation to the knife, a knife carriage pivoted eccentrically with relation to the knife on an axis substantially parallel with the axis of the knife, and means for swinging the carrier to adjust the knife radially.

30. A machine for operating on shoes having, in combination, a rotary trimming knife, guides for positioning the shoe with relation to the knife, a knife carriage pivoted eccentrically with relation to the knife on an axial substantially parallel with the axis of the knife and movable longitudinally of its pivotal axis, means for moving the carrier longitudinally of its pivotal axis, and a carriage guiding device operating during said movement of the carriage to swing the carriage about its pivotal axis to adjust the knife radially.

31. A machine for operating on shoes having, in combination, a rotary trimming knife, guides for positioning the shoe with relation to the knife, a knife carriage pivoted eccentrically with relation to the knife on an axis substantially parallel with the axis of the knife and movable longitudinally of its pivotal axis, means for adjusting the carriage longitudinally of its pivotal axis, and means for swinging the carriage comprising inclined gear teeth formed on the carriage and a rotatable spiral pinion meshing with said gear teeth.

32. A machine for operating on shoes having in combination, means for operating on a shoe, a shoe supporting jack, means for imparting lateral movements to the jack, and devices including a channel guide and a crease guide engaging the shoe at the point of operation and causing the movements imparted to the jack to tip the shoe about said devices as a fulcrum to locate the shoe bottom in the proper plane.

33. A machine for operating on shoes having, in combination, a movable shoe-support, an inseam-trimming knife and a vibrating welt-beating member co-operating therewith, and means for guiding the support comprising a crease-guide arranged to support the welt under the blows of the beating member.

34. A machine for operating on shoes having, in combination, an inseam trimming knife, a welt beating hammer fixed in the direction of feed, means for feeding a shoe past the trimming knife and hammer, and separate means for guiding the shoe as it is fed comprising a crease guide arranged to support the welt under the blows of the hammer.

35. A machine for operating on shoes having, in combination, an inseam trimming knife, a shoe supporting jack, means for relatively moving the jack and knife to transfer the point of operation around the shoe, shoe guiding devices including a channel guide, means for maintaining the inner surface of the sewing rib and the bottom of the channel of the shoe sole in contact with the channel guide, and mechanism for changing the relative positions of the knife and shoe to compensate for the surface and edge curvatures of the shoe sole as the point of operation is transferred around the shoe.

36. A machine for operating on shoes having, in combination, an inseam trimming knife, a shoe supporting jack, means for relatively moving the jack and knife to transfer the point of operation around the shoe, a channel guide, means for maintaining the inner surface of the sewing rib and the bottom of the channel of the shoe sole in contact with the channel guide, mechanism for changing the relative positions of the knife and shoe to compensate for the surface and edge curvatures of the shoe sole as the point of operation is transferred around the shoe, and a guard acting on the welt to hold the inseam stitches away from the knife.

37. A machine for operating on shoes having, in combination, an inseam trimming knife, a shoe supporting jack, means for moving the jack to transfer the point of operation around the shoe, a channel guide, a guard fixed in the direction of feed acting on the welt close to the edge of the knife to hold the inseam stitches away from the knife, and mechanism for changing the relative positions of the knife and shoe to compensate for the surface and edge curvatures of the shoe sole as the point of operation is transferred around the shoe.

38. A machine for operating on shoes having, in combination, an inseam trimming knife, a shoe supporting jack, means for moving the jack to transfer the point of operation around the shoe, guides in contact with which the shoe is moved including a channel guide and a crease guide, a guard acting on the welt to hold the inseam stitches away from the knife, and mechanism for changing the relative positions of the knife and shoe to compensate for the surface and edge curvatures of the shoe sole as the point of operation is transferred around the shoe.

39. A machine for operating on shoes having, in combination, an inseam trimming knife, a shoe supporting jack, means for moving the jack to transfer the point of operation around the shoe, a guide in contact with which the shoe is moved, a guard acting on the welt to hold the inseam stitches away from the knife, and mechanism for changing the relative positions of the knife and shoe to compensate for the surface and edge curvatures of the shoe sole as the point of operation is transferred around the shoe.

40. A machine for operating on shoes having, in combination, a shoe supporting jack, welt beating mechanism including a support on the grain side of the welt, a vibrating beater cooperating therewith, guiding means in contact with which the shoe is moved, and mechanism for changing the relative positions of the shoe and welt beating mechanism to compensate for the surface and edge curvatures of the shoe sole as the point of operation is transferred around the shoe.

41. A machine for operating on shoes having, in combination, means for operating on a shoe comprising an inseam trimming knife and welt beating elements, a shoe supporting jack, means for moving the jack to transfer the point of operation of the operating means around the shoe, a guide in contact with which the shoe is moved, and mechanism for changing the relative positions of the operating means and shoe to compensate for the surface and edge curvatures of the shoe sole as the point of operation is transferred around the shoe.

42. A machine for operating on shoes having, in combination, means for operating on a shoe comprising an inseam trimming knife, shoe guiding devices including a channel guide and a crease guide in contact with which the shoe is moved, a vibrating beater cooperating with the crease guide to beat out the welt, a shoe supporting jack, means for moving the jack to transfer the point of operation around the shoe, and mechanism for changing the relative positions of the trimming knife and shoe to compensate for the surface and edge curvatures of the shoe sole as the point of operation is transferred around the shoe.

43. A machine for operating on shoes having, in combination, an inseam trimming knife, a channel guide, a crease guide, and a vibrating beater cooperating with the crease guide to beat out the welt.

44. A machine for operating on shoes having, in combination, a tubular inseam trimming knife, a crease guide, a vibrating beater cooperating with the crease guide to beat out the welt, and a guide arranged to engage the welt near its inner edge and hold it up to the knife.

45. A machine for operating on shoes having, in combination, an inseam trimming knife, means for actuating the knife, guides for positioning the shoe with relation to the knife, a shoe supporting jack, mechanism for changing the relative positions of the shoe and the knife to present the shoe properly to the knife as the point of operation is transferred around the shoe, and means for moving the jack out of operative position at the completion of the inseam trimming operation.

46. A machine for operating on shoes having, in combination, an inseam trimming knife, means for actuating the knife, guides in contact with which the shoe is moved, a shoe supporting jack, mechanism for changing the relative positions of the shoe and the knife to present the shoe properly to the knife as the point of operation is transferred about the shoe, and mechanism for stopping the knife and for then moving the jack out of operating position.

47. A machine for operating on shoes having, in combination, an inseam trimming knife, means for actuating the knife, guides in contact with which the shoe is moved, a shoe supporting jack, mechanism for changing the relative positions of the shoe and the knife to present the shoe properly to the knife as the point of operation is transferred around the shoe, and means acting automatically to stop the knife at the completion of the inseam trimming operation.

48. A machine for operating on shoes having, in combination, an inseam trimming knife, guides for positioning the shoe with relation to the knife, relatively movable into and out of operative position, and means acting on starting the machine for relatively moving the guides to operative position.

49. A machine for operating on shoes having, in combination, an inseam trimming knife, a shoe supporting jack, mechanism for changing the relative positions of the shoe and and knife to present the shoe properly to the knife as the point of operation is transferred around the shoe, guides in contact with which the shoe is moved, relatively movable into and out of operative position, and means for relatively moving the guides into operative position after the shoe has been brought to starting position.

50. A machine for operating on shoes having, in combination, an inseam trimming knife, knife actuating mechanism, a shoe supporting jack, mechanism for changing the relative positions of the shoe and the knife to present the shoe properly to the knife as the point of operation is transferred around the shoe, guides in contact with which the shoe is moved, and means for throwing the knife actuating mechanism into operation after the shoe has been brought to starting position.

51. A machine for operating on shoes having, in combination, a rotary trimming knife, a rotary grinding tool for grinding the knife, driving mechanism for the tool arranged to be thrown into and out of operation, and means for preventing the driving mechanism from being thrown into operation during the operation on a shoe.

52. A machine for operating on shoes having, in combination, a rotary trimming knife, a rotary grinding tool for grinding the knife, driving mechanism for the tool arranged to be thrown into and out of operation, and means for preventing the driving mechanism from being thrown out of operation during the operation on a shoe.

53. A machine for operating on shoes having, in combination, a vibrating welt beating hammer, a welt support cooperating therewith arranged to engage the crease between the upper and welt, and means made effective in the operation of the machine for moving said support into and out of operating position.

54. A machine for operating on shoes having, in combination, a vibrating welt beating hammer, a welt support cooperating therewith arranged to engage the crease between the upper and welt, a toggle connected to the support to hold it in operating position, and means for breaking the toggle.

55. In a machine of the class described, a shoe support, mechanisms for simultaneously performing independent operations upon different elements of a supported shoe, and means for causing the points of operation between the operating means and shoe to follow predetermined paths.

56. In a machine of the class described, a shoe-support, a trimming device, a beating device, and mechanism for moving the support and devices relatively to maintain a predetermined relation between the supported shoe and said devices.

57. In a machine of the class described, a shoe support mounted for universal movement, and an inseam trimming device and a welt beating device in cooperation with which a supported shoe is moved.

58. In an inseam trimming and welt beating machine, a jack, a jack support mounted for universal movement, a guide for engagement with a jacked shoe during such movement, and trimming and beating members for operating upon the shoe in its movement.

59. In a machine of the class described, a shoe support, a beating member for operating upon a supported shoe, and mechanism constructed and arranged to move the operating means and the shoe relatively as the point of operation is transferred around the shoe.

60. In a machine of the class described, a jack, a jack support mounted for universal movement, a guide for engagement with a jacked shoe and serving as a fulcrum during the universal movement of the support, and a welt beating member operating upon the shoe in this movement.

61. In a machine of the class described, a shoe support mounted for universal movement, a guide with which a supported shoe contacts during such movement, and a trimming member acting upon the inseam of a supported shoe as it is thus moved.

62. In a machine of the class described, a movable shoe support, an inseam trimming device cooperating therewith, a guide along which the shoe is moved by the support, and automatic means for moving the guide.

63. In a machine of the class described, a shoe support, an inseam trimming device cooperating therewith, means for positioning a supported shoe with relation to the trimming device, automatic means for moving the positioning means to facilitate a change in the location of the shoe, and automatic means for moving the support out of operating position.

64. In a machine of the class described, a movable shoe support, a welt beating device, a guide along which the shoe is moved by the support, and means for moving the guide and beating device relatively to facilitate a change in the location of the shoe.

65. In a machine of the class described, an inseam trimming device, a welt beating device, a guide for positioning a shoe with relation to said devices, and automatic means for moving the guide toward and from said devices.

66. In a machine of the class described, an inseam trimming device, a welt beating device including a member furnishing a work guide, an associated work guiding member, and means arranged to simultaneously move said members to cause their separation and approach.

67. In a machine for operating upon shoes, operating mechanism, a shoe support, mechanism for moving the support to present a supported shoe to the operating mechanism, and members engaging the channel and crease of the shoe to guide the support and shoe during such movement.

68. In a machine for operating upon shoes, operating mechanism, a shoe support, mechanism for determining the relative positions of a supported shoe and the operating mechanism as the point of operation is transferred about the shoe, and members engaging the channel and crease of the shoe to guide the support and shoe during such movement.

69. In a machine of the class described, a plurality of welt beating members, one of which is held against movement during the beating operation and arranged to serve as a guide for the work, and an associated work guiding member past which the work travels.

70. In a machine of the class described, a plurality of welt beating members, one of which is arranged to serve as a guide for the work, an associated work guiding member, and mechanism for rotating said associated member to exert a feeding action on the work.

71. In a machine for operating upon shoes, a movable trimming member, a movable grinding member therefor, and automatic means arranged to prevent the initiation of the grinding movement of said grinding member after said trimming member is in motion.

72. In a machine for operating upon shoes, a movable trimming member for acting upon the work during a definite cycle, a movable grinding member therefor, and means arranged to insure continuation of the grinding movement of said grinding member until the completion of a cycle.

73. In a machine for operating upon shoes, a movable trimming member, a movable grinding member therefor, and a lock for preventing said grinding movement, said lock being controlled in the operation of the machine.

74. In a machine for operating upon shoes, a movable trimming member, a movable grinding member for the trimming member, means movable by the operator to initiate the grinding movement of said grinding member, and power actuated mechanism for controlling the grinding movement, said controlling mechanism being effective when the grinding member and trimming member are both out of contact and in contact.

75. In a machine for operating upon shoes, a movable knife into and out of engagement with which a shoe is moved, means for starting and stopping the movement of the knife, a member arranged to guide a shoe in cooperation with the knife and movable into and out of its guiding relation, and mechanism arranged to move the member into such guiding relation before the movement of the knife is started.

76. In a machine of the class described, a movable shoe support, a plurality of mechanisms for operating upon a supported shoe, one of said mechanisms including an element serving to guide the shoe in its movement, another shoe guide, means for starting and stopping the operating mechanism, and mechanism arranged to move the guiding elements toward each other before starting the operating mechanisms.

ALFRED R. MORRILL.